United States Patent
Meier et al.

(10) Patent No.: US 12,540,513 B2
(45) Date of Patent: *Feb. 3, 2026

(54) POLYCRYSTALLINE DIAMOND BODIES INCLUDING ONE OR MORE THREADS, APPARATUSES INCLUDING THE SAME, AND METHODS OF FORMING AND USING THE SAME

(71) Applicant: US Synthetic Corporation, Orem, UT (US)

(72) Inventors: Jarrett Meier, Lehi, UT (US); Grant Kyle Daniels, Spanish Fork, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,201

(22) Filed: Jun. 13, 2024

(65) Prior Publication Data
US 2024/0410233 A1    Dec. 12, 2024

Related U.S. Application Data

(63) Continuation of application No. 17/680,729, filed on Feb. 25, 2022, now Pat. No. 12,037,851.

(60) Provisional application No. 63/154,277, filed on Feb. 26, 2021.

(51) Int. Cl.
| | |
|---|---|
| *E21B 10/573* | (2006.01) |
| *E21B 10/42* | (2006.01) |
| *E21B 10/633* | (2006.01) |
| *F16C 33/04* | (2006.01) |

(52) U.S. Cl.
CPC .......... *E21B 10/5735* (2013.01); *E21B 10/42* (2013.01); *E21B 10/633* (2013.01); *F16C 33/043* (2013.01)

(58) Field of Classification Search
CPC .... E21B 10/567–10/5735; E21B 10/46; F16C 33/04
See application file for complete search history.

(56) References Cited

U.S. PATENT DOCUMENTS

| | | |
|---|---|---|
| 4,268,276 A | 5/1981 | Bovenkerk |
| 4,274,900 A | 6/1981 | Mueller et al. |
| 4,410,054 A | 10/1983 | Nagel et al. |
| 4,468,138 A | 8/1984 | Nagel |
| 4,560,014 A | 12/1985 | Geczy |
| 4,738,322 A | 4/1988 | Hall et al. |
| 4,811,801 A | 3/1989 | Salesky et al. |

(Continued)

OTHER PUBLICATIONS

Advisory Action for U.S. Appl. No. 17/680,729 mailed Jan. 16, 2024.

(Continued)

*Primary Examiner* — Blake Michener
(74) *Attorney, Agent, or Firm* — Ballard Spahr LLP

(57) ABSTRACT

An example PCD body includes a top surface, a bottom surface opposite the top surface, and at least one lateral surface extending between the top surface and the bottom surface. The PCD body includes one or more threads that are configured to allow the PCD body to be threadedly attached to a component, such as a substrate, a drill bit body, or a support ring. In an embodiment, the one or more threads may be formed on at least a portion of the lateral surface.

20 Claims, 8 Drawing Sheets

(56) References Cited

U.S. PATENT DOCUMENTS

| | | |
|---|---|---|
| 4,913,247 A | 4/1990 | Jones |
| 5,016,718 A | 5/1991 | Tandberg |
| 5,092,687 A | 3/1992 | Hall |
| 5,120,327 A | 6/1992 | Dennis |
| 5,135,061 A | 8/1992 | Newton, Jr. |
| 5,154,245 A | 10/1992 | Waldenstroem et al. |
| 5,332,348 A * | 7/1994 | Lemelson ............... C23C 16/274 411/902 |
| 5,364,192 A | 11/1994 | Damm et al. |
| 5,368,398 A | 11/1994 | Damm et al. |
| 5,460,233 A | 10/1995 | Meany et al. |
| 5,480,233 A | 1/1996 | Cunningham |
| 5,544,713 A | 8/1996 | Dennis |
| 5,810,103 A * | 9/1998 | Torbet ................. E21B 10/5673 175/428 |
| 6,283,234 B1 | 9/2001 | Torbet |
| 6,793,681 B1 | 9/2004 | Pope et al. |
| 7,866,418 B2 | 1/2011 | Bertagnolli et al. |
| 7,942,218 B2 * | 5/2011 | Cooley ................. E21B 10/633 175/432 |
| 8,297,382 B2 | 10/2012 | Bertagnolli et al. |
| 8,701,798 B1 | 4/2014 | Qian et al. |
| 9,062,505 B2 | 6/2015 | Crockett et al. |
| 9,346,149 B1 | 5/2016 | Linford et al. |
| 10,253,571 B2 * | 4/2019 | Propes ................. E21B 17/042 |
| 10,501,998 B1 | 12/2019 | Linford et al. |
| 2007/0023206 A1 | 2/2007 | Keshavan et al. |
| 2012/0177772 A1 | 7/2012 | Judd |
| 2022/0275686 A1 * | 9/2022 | Meier ................. E21B 10/633 |

OTHER PUBLICATIONS

Final Office Action for U.S. Appl. No. 17/680,729 mailed Oct. 5, 2023.

Non-Final Office Action for U.S. Appl. No. 17/680,729 mailed Mar. 28, 2023.

Notice of Allowance for U.S. Appl. No. 17/680,729 mailed Mar. 18, 2024.

U.S. Appl. No. 13/790,046, filed Mar. 8, 2013.
U.S. Appl. No. 14/273,360, filed May 8, 2014.
U.S. Appl. No. 14/275,574, filed May 12, 2014.
U.S. Appl. No. 14/811,699, filed Jul. 28, 2015.
U.S. Appl. No. 16/084,469, filed Sep. 12, 2018.
U.S. Appl. No. 17/680,729, filed Feb. 25, 2022.
U.S. Appl. No. 62/232,732, filed Sep. 25, 2015.
U.S. Appl. No. 63/154,277, filed Feb. 26, 2021.

* cited by examiner

POLYCRYSTALLINE DIAMOND BODIES INCLUDING ONE OR MORE THREADS, APPARATUSES INCLUDING THE SAME, AND METHODS OF FORMING AND USING THE SAME

BACKGROUND

Wear-resistant, superabrasive compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. PDCs have also found particular utility as superhard bearing elements in bearing apparatuses, such as thrust-bearing and radial bearing apparatuses, by providing diamond surfaces that bearing against each other during use. The rotary drill bits and bearing apparatuses typically includes a number of PDCs affixed to a bit body or support ring, respectively. The PDCs are mounted to the bit body or support ring by press-fitting or brazing into a receptacle formed in the bit body or support ring. However, press-fitting or brazing the PDCs into the bit body or support ring may make repair (e.g., due to failure of the PDCs) of the rotary drill bits or bearing apparatuses that include the PDCs difficult and may cause thermal damage to the PDCs.

A PDC typically includes a superabrasive diamond layer commonly referred to as a diamond table. The diamond table may be formed and bonded to a substrate using a high-pressure, high-temperature ("HPHT") process. The HPHT process may include placing a cemented carbide substrate into a container with a volume of diamond particles positioned adjacent to the cemented carbide substrate. A number of such cartridges may be loaded into an HPHT press. The substrates and volume of diamond particles are then processed under HPHT conditions in the presence of a catalyst material that causes the diamond particles to bond to one another to form a matrix of bonded diamond grains defining a polycrystalline diamond ("PCD") table that is bonded to the substrate. The catalyst material is often a metal-solvent catalyst (e.g., cobalt, nickel, iron, or alloys thereof) that is used for promoting intergrowth of the diamond particles.

SUMMARY

Embodiments disclosed herein include polycrystalline diamond ("PCD") tables including one or more threads, apparatuses including the same, and methods of forming and using the same. In an embodiment, a polycrystalline diamond body is disclosed. The polycrystalline diamond body includes a top surface, a bottom surface opposite the top surface, at least one lateral surface extending from or near the top surface to or near the bottom surface, and one or more threads formed on at least a portion of at least one surface of the polycrystalline diamond body.

In an embodiment, an apparatus is disclosed. The apparatus includes at least one polycrystalline diamond body including a top surface, a bottom surface opposite the top surface, at least one lateral surface extending from or near the top surface to or near the bottom surface, and one or more threads formed on at least a portion of at least one surface of the polycrystalline diamond body. The apparatus also includes a body including one or more body thread that are configured to interact with the one or more threads to threadedly attach the at least one polycrystalline diamond body to the body.

In an embodiment, a method of forming a polycrystalline diamond body is disclosed. The method includes forming one or more threads on at least a portion of at least one surface of a polycrystalline diamond body. The polycrystalline diamond body includes a top surface, a bottom surface opposite the top surface, and the at least one lateral surface extending from or near the top surface to or near the bottom surface.

In an embodiment, a method is disclosed. The method includes, while in a field and after a polycrystalline diamond body has spalled, detaching the polycrystalline diamond from a body. The polycrystalline diamond body includes a top surface, a bottom surface opposite the top surface, at least one lateral surface extending from or near the top surface to or near the bottom surface, and one or more threads formed on at least a portion of at least one surface of the polycrystalline diamond body. The body includes one or more body thread that are configured to interact with the one or more threads to threadedly attach the at least one polycrystalline diamond body to the body.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Figure 1A:
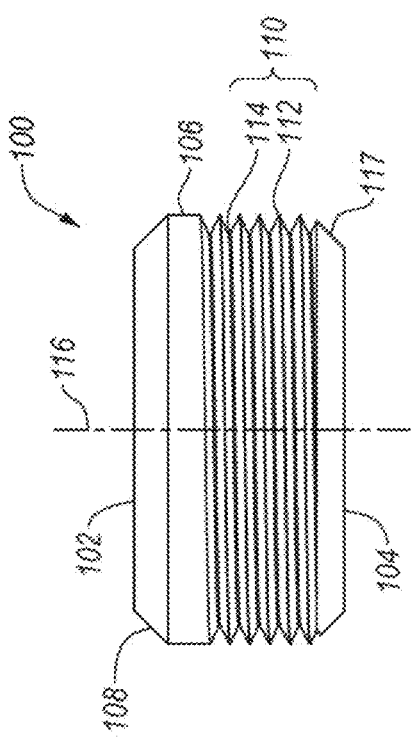
FIG. 1A is a side elevational view of a PCD body, according to an embodiment.

Embodiments disclosed herein include polycrystalline diamond ("PCD") bodies including one or more threads, apparatuses including the same, and methods of forming and using the same. An example PCD body includes a top surface, a bottom surface opposite the top surface, and at least one lateral surface extending between the top surface and the bottom surface. The PCD body includes one or more threads that are configured to allow the PCD body to be threadedly attached to a component, such as a substrate, a drill bit body, or a support ring. In an embodiment, the one or more threads may be formed on at least a portion of the lateral surface.

In some applications, the threads may improve attaching the PCD body to the component compared to other conventional methods of attaching the PCD body to the component. In an embodiment, a PCD body that does not include one or more threads ("threadless PCD body") may be metallurgically bonded or brazed to a cemented carbide substrate to form a polycrystalline diamond compact ("PDC"). Bonding and/or brazing the threadless PCD body to the cemented carbide substrate may cause several issues. For example, bonding the threadless PCD body to the cemented carbide substrate requires a catalyst (e.g., metal solvent catalyst) to at least partially occupy pores between the bonded diamond grains which may reduce the thermal stability of the threadless PCD. Brazing the threadless PCD body to the substrate may cause thermal damage to the threadless PCD body. Further, the threadless PCD body and/or a PDC that includes the threadless PCD body may be attached to a component other than the substrate (e.g., bit body or support ring) via an interference fit or brazing to form an apparatus. However, the interference fit and the brazing techniques may prevent replacement of the threadless PCD bodies in the field when the threadless PCD body fails. Instead, the apparatus may need to a specialized facility to remove and replace the failed threadless PCD body. Shipping the apparatus to the specialized facility may take a significant amount of time, require replacement apparatuses for operations while the apparatus is shipped and repair, and can be costly. Further, brazing the threadless PCD body and/or PDC that includes the threadless PCD body to the component may cause liquid metal embrittlement and cause thermal damage to the PCD body. It is noted that, as used herein, the "field" refers to a location were the apparatuses are used and is distinct from a specialized facilitate that includes equipment specially configured to braze and/or facilitate interference fit between the threadless PCD body and the component.

The PCD bodies disclosed herein that include the one or more threads which, in some embodiments, may represent an improvement over the threadless PCD body. For example, the one or more table treads allows the PCD bodies disclosed herein to be attached to a component (e.g., substrate, drill bit, or support ring) without a metallurgical bond, a braze, or an interference fit thereby preventing the issues associated with such attachment methods. Further, the threads may allow the PCD bodies to be detached from the components when the PCD bodies fail and a replacement PCD body that also includes threads to be attached to the component in the field. Thus, the PCD bodies disclosed herein that include the one or more threads may prevent some of the issues discussed above with regards to the threadless PCD body.

FIG. 1A is a side elevational view of a PCD body 100, according to an embodiment. The PCD body 100 includes a top surface 102 and a bottom surface 104 opposite the top surface 102. In the illustrated embodiment, the top surface 102 and the bottom surface 104 are illustrated as being substantially planar. However, it is noted that the top surface 102 and/or the bottom surface 104 may be non-planar (e.g., curved, dimpled, etc.). For example, the top surface 102 may be curved (e.g., convexly or concavely) when the PCD body 100 is used in a radial bearing assembly. The PCD body 100 also include at least one lateral surface 106 extending between the top surface 102 and the bottom surface 104. In an embodiment, the PCD body 100 may include at least one chamfer 108, for example, extending from the top surface 102 to the lateral surface 106.

The PCD body 100 also includes one or more threads 110 formed in at least a portion of the lateral surface 106. The threads 110 may be formed as any suitable type of thread and/or according to any standard. In an embodiment, the threads 110 may be formed as 60° V threads, API threads, UNEF threads, helical profile sweep, rope threads, UNR threads, UNJ threads, ACME threads, Whitworth threads, ball screw threads, worm threads, NPT threads, NPTF threads, BSPT threads, buttress thread, UTS threads, British standard threads, or any other type of thread. In an embodiment, the threads 110 may exhibit a generally triangular cross-sectional shape, such as a generally isometric triangular cross-sectional shape. (as shown). In an embodiment, the threads 110 may exhibit a generally square cross-sectional shape, a generally trapezoidal cross-sectional shape, or any other suitable cross-sectional shape. In an embodiment, the threads 110 may be right-handed threaded or left-handed threaded, depending on whether forces applied to the PCD body 100 during use are expected to apply a clockwise or counter-clockwise rotation to the PCD body 100.

The threads 110 may be formed on all of or only a portion of the lateral surface 106. For example, the threads 110 may be formed on about 5% to about 20%, about 10% to about 30%, about 20% to about 40%, about 30% to about 50%, about 40% to about 60%, about 50% to about 70%, about 60% to about 80%, about 70% to about 90%, about 80% to about 99%, or all of the lateral surface 106 of the PCD body 100. The percentage of the lateral surface 106 that includes the threads 110 formed thereon may depend on a variety of factors. In an embodiment, the percentage of the lateral surface 106 that includes the threads 110 may be selected based on the length of the lateral surface 106 measured along the screw axis 116 of the threads 110, the pitch of the threads 110, and/or the expected force that is applied to the PCD body 100 during use. For instance, increasing the force applied to the PCD body 100 and decreasing the pitch of the threads 110 increases the likelihood that the threads 110 become damaged. However, increasing the percentage of the lateral surface 106 that includes the threads 110 decreases the likelihood that the threads 110 become damaged. In an embodiment, the percentage of the lateral surface 106 that includes the threads 110 may be selected to be as small as possible because it is difficult to form the threads 110 in the lateral surface 106 due to the hardness of the PCD body 100. In an embodiment, the percentage of the lateral surface 106 that includes the threads 110 may depend on how much of the lateral surface 106 is exposed (e.g., extends above) when the PCD body 100 is attached to the component. Generally, it is desirable to reduce the quantity of the threads 110 that are exposed when the PCD body 100 is attached to the component during high stress and/or high wear applications. For instance, the valleys 114 of the threads 110 may form stress concentrators that increase the likelihood that the PCD body 100 prematurely fails and the threads 110 may increase the surface area of the lateral surface 106 that may wear. In some embodiments, the threads 110 may be formed on a surface other than the lateral surface 106, such as on at least a portion of the chamfer 108.

The threads 110 may be a single start thread or a multiple start thread. A start refers to the number of distinct threads that are formed on the lateral surface 106. For example, the single start thread includes a single helical thread (e.g., helically extending ridge) along the lateral surface 106 whereas the multiple start thread that includes a plurality of intertwined threads. When the threads 110 are a multiple start thread, the threads 110 may include any number of starts, such as 2-4, 3-5, 4-6, 5-7, 6-8, 7-9, 8-10, 9-11, 10-12, 11-13, 12-14, 13-15, 14-16, 15-17, 16-18, 17-19, 18-20, 19-21, or more than 20 starts. Generally, increasing the number of starts makes attaching the PCD body 100 to a component quicker. For example, rotating the PCD body 100 360° advances the PCD body 100 into the base by a distance that is equal to the pitch of the threads 110 times the number of starts. However, increasing the number of starts of the threads 110 may decrease the distance between adjacent peaks 112 which may make the threads 110 more likely to be damaged. As such, the number of starts may be selected to be smaller when larger forces are expected to be applied to the PCD body 100 compared to a PCD body 100 that is expected to have smaller forces applied thereto.

The threads 110 exhibit a pitch that is the distance between adjacent peaks 112. The pitch of the threads 110 may be selected to be greater than about 0.3 mm, greater than about 0.4 mm, greater than about 0.5 mm, greater than about 0.6 mm, greater than about 0.7 mm, greater than about 0.8 mm, greater than about 0.9 mm, greater than about 1 mm, greater than about 1.2 mm, greater than about 1.4 mm, greater than about 1.6 mm, greater than about 1.8 mm, greater than about 2 mm, greater than about 2.25 mm, greater than about 2.5 mm, greater than about 2.75 mm, greater than about 3 mm, greater than about 3.5 mm, greater than about 4 mm, greater than about 5 mm, greater than about 6 mm, greater than about 7 mm, greater than about 8 mm, greater than about 10 mm, greater than about 12.5 mm, greater than about 15 mm, greater than about 20 mm, or in ranges of about 0.3 mm to about 0.5 mm, about 0.4 mm to about 0.6 mm, about 0.5 mm to about 0.7 mm, about 0.6 mm to about 0.8 mm, about 0.7 mm to about 0.9 mm, about 0.8 mm to about 1 mm, about 0.9 mm to about 1.2 mm, about 1 mm to about 1.4 mm, about 1.2 mm to about 1.6 mm, about 1.4 mm to about 1.8 mm, about 1.6 mm to about 2 mm, about 1.8 mm to about 2.25 mm, about 2 mm to about 2.5 mm, about 2.25 mm to about 2.75 mm, about 2.5 mm to about 3 mm, about 2.75 mm to about 3.5 mm, about 3 mm to about 4 mm, about 3.5 mm to about 5 mm, or about 4 mm to about 6 mm, about 5 mm to about 7 mm, about 6 mm to about 8 mm, about 7 to about 10 mm, about 8 to about 12.5 mm, about 10 mm to about 15 mm, or about 12.5 mm to about 20 mm. The pitch of the table threads 110 may be selected to be greater than about 1% the minor or major diameter of the table threads 110, such as greater than about 5%, greater than about 10%, greater than about 20%, greater than about 30%, greater than about 40%, greater than about 50%, greater than about 60%, greater than about 80%, greater than about 100%, greater than about 125%, greater than about 150%, greater than about 200%, greater than about 250%, greater than about 300%, or in ranges of about 1% to about 10%, about 5% to about 20%, about 10% to about 30%, about 20% to about 40%, about 30% to about 50%, about 40% to about 60%, about 50% to about 80%, about 60% to about 100%, about 80% to about 125%, about 100% to about 150%, about 125% to about 200%, about 150% to about 250%, or about 200% to about 300% the minor or major diameter of the table threads 110.

The pitch may be selected based on a number of factors. In an example, the pitch of the threads 110 may be selected based on the hardness of the threads formed on the component. The pitch of the threads 110 match the pitch of the threads of the component to which the PCD body 100 is configured to be attached. The likelihood that the threads 110 and the threads of the component become damaged depends, at least to some extent, on the hardness of the material that forms the threads of the component. Generally, the hardness of the threads 110 are greater than the hardness of the threads of the component. Thus, the hardness of the threads of the component may limit the pitch of the threads 110. In an example, the pitch of the threads 110 may depend on the application that the PCD body 100 is configured to be used in and, more particularly, the force that is expected to be applied to the PCD body 100 in such an application. As previously discussed, the likelihood that the threads 110 and/or the threads of the component become damaged depends on the magnitude of the force applied to the PCD body 100 (e.g., increasing the force increases the likelihood of damage and vice versa). As such, in one non-limiting example, the pitch of the threads 110 may be relatively coarse (e.g., greater than about 1 mm) when the PCD body 100 is used in a subterranean drilling application or a high load bearing assembly. However, in another non-limiting example, the pitch of the threads 110 may be relatively fine (e.g., less than 1.5 mm or less than 1 mm) when used in a low load bearing assembly. In an example, the pitch may be selected depending on how fine of adjustments (e.g., adjusting distance that the top surface 102 extends from the component, etc.) and how quickly the PCD body 100 is attached to the component is desired. For instance, decreasing the pitch allows for more fine adjustments while increasing the pitch allows for quicker attachment of the PCD body 100 to the component.

Figure 2:
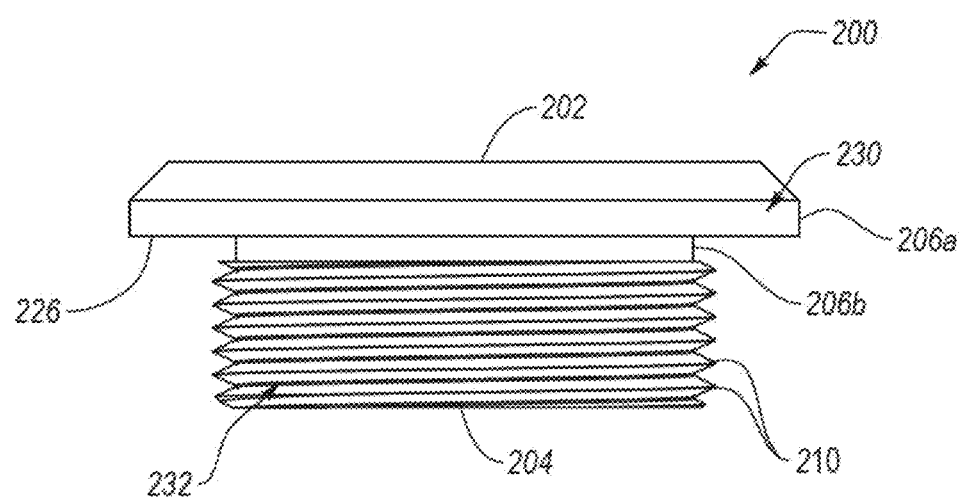
FIG. 2 is a side elevational view of a PCD body, according to an embodiment.

The threads 110 may exhibit any suitable major diameter (e.g., the maximum diameter of a cylinder that touches the peaks 112) and any suitable minor diameter (e.g., the minimum diameter of a cylinder that touches the valleys 114). The major and minor diameters of the threads 110 may be selected independently to be greater than about 0.5 cm, greater than about 0.75 cm, greater than about 1 cm, greater than about 1.25 cm, greater than about 1.5 cm, greater than 1.75 cm, greater than about 2 cm, greater than about 2.5 cm, greater than about 3 cm, greater than about 3.5 cm, greater than about 4 cm, greater than about 4.5 cm, greater than about 5 cm, or in ranges of about 0.5 cm to about 1 cm, about 0.75 cm to about 1.25 cm, about 1 cm to about 1.5 cm, about 1.25 cm to about 1.75 cm, about 1.5 cm to about 2 cm, about 1.75 cm to about 2.5 cm, about 2 cm to about 3 cm, about 2.5 cm to about 3.5 cm, about 3 cm to about 4 cm, about 3.5 cm to about 4.5 cm, or about 4 cm to about 5 cm. The major and minor diameter of the threads 110 may be selected based on the maximum lateral dimension of the PCD body 100, the size of the cavity that is configured to receive the PCD body 100, the pitch of the threads 110, and whether the PCD body 100 includes a protrusion (as shown in FIG. 2).

The depth of the threads 110 is the difference between the major and minor diameters of the threads 110. The depth may be selected to be about 0.05 mm to about 0.15 mm, about 0.1 mm to about 0.2 mm, about 0.15 mm to about 0.25 mm, about 0.2 mm to about 0.3 mm, about 0.25 mm to about 0.35 mm, about 0.3 mm to about 0.4 mm, about 0.35 mm to about 0.45 mm, about 0.4 mm to about 0.5 mm, about 0.45 mm to about 0.6 mm, about 0.5 mm to about 0.7 mm, about 0.6 mm to about 0.8 mm, about 0.7 mm to about 0.9 mm, about 0.8 mm to about 1 mm, about 0.9 mm to about 1.2 mm, about 1 mm to about 1.5 mm, about 1.25 mm to about 1.75 mm, about 1.5 mm to about 2 mm, about 1.75 mm to about 2.5 mm, about 2 mm to about 3 mm, about 2.5 mm to about 3.5 mm, about 3 mm to about 4 mm, about 3.5 mm to about 6 mm, about 5 mm to about 7 mm, or about 6 mm to about 8 mm. The depth of the threads 110 may be selected based on the pitch of the threads 110 and the angle that the surfaces of the thread 110 extend relative to the screw axis 116. The depth of the threads 110 may also be selected based on whether the threads 110 are truncated. The threads 110 are truncated when the outermost and innermost portions of the peaks 112 and valleys 114, respectively, are not sharp angles and are instead, for example, rounded or flat. Truncating the threads 110 may decrease the depth of the threads 110 which may increase the likelihood that the threads 110 and/or the threads of the component become damaged. However, truncating the threads 110 may make manufacturing of the threads 110 easier and quicker and reduces wear on the device that forms the threads (e.g., electrodes or grinding wheel).

Generally, the PCD body 100 exhibits a generally circular shape (e.g., a generally cylindrical shape) where the lateral surface 106 includes the threads 110. The generally circular cross-sectional shape allows the PCD body 100 to be threadedly attached to the component while reducing gaps between the lateral surface 106 PCD body 100 and surface of the component that contacts the lateral surface 106. However, the generally circular shape may make gripping the PCD body 100 difficult when tightening or loosening the PCD body 100. For instance, the generally circular cross-sectional shape may prevent or limit pliers or wrenches from mechanically gripping the PCD body 100. As such, in some examples, the portions of the PCD body 100 (e.g., portions that do not include the threads 110) may exhibit a generally non-circular cross-sectional shape (e.g., a generally non-cylindrical shape), such as a cross-sectional shape that exhibits at least one flat side, an elongated cross-sectional shape, a generally rectangular (e.g., square) cross-sectional shape, or a generally hexagonal cross-sectional shape. Such non-circular cross-sectional shapes may facilitate gripping the PCD body 100 with pliers, wrench, or other tools which facilitate tightening and loosening the PCD body 100 with such tools. In other examples, one or more recesses may be formed in the top surface 102 that allow the PCD body 100 to be tightened or loosened with a screwdriver. Examples of such recesses include a single straight recess, a generally square recess, a hexagonal recess, a generally triangular recess, two intersecting recesses in the form of a cross, or a recess exhibiting the shape of a 6-pointed star. In some embodiments, the PCD body 100 exhibits a generally non-circular shape where the lateral surface 106 includes the table threads 110, such as a generally tri-lobed shape.

Figure 1B:
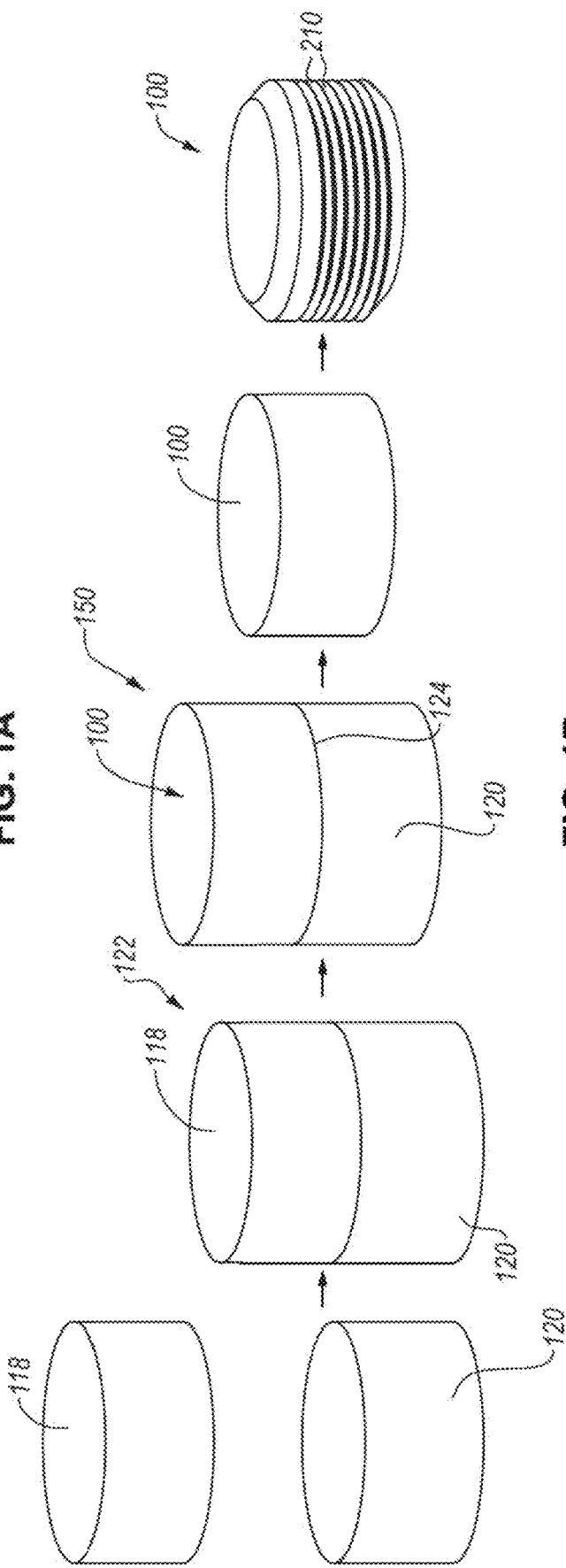
FIG. 1B is a schematic illustration of an embodiment of a method for fabricating the PCD body, according to any embodiment.

FIG. 1B is a schematic illustration of an embodiment of a method for fabricating the PCD body 100, according to any embodiment. It is noted that the method illustrated in FIG. 1B may be used to form any of the PCD bodies disclosed herein. Referring to FIG. 1B, a mass of diamond particles 118 is positioned adjacent to a substrate 120. The mass of diamond particles 118 may exhibit an average particle size of about 0.1 µm to about 150 µm (e.g., about 50 µm or less, about 30 µm or less, about 20 µm or less, about 15 µm or less, about 10 µm or less, about 5 µm to about 15 µm, about 10 µm to about 20 µm, about 18 µm to about 20 µm, or about 15 µm to about 18 µm). The diamond particle size distribution of the mass of diamond particles 118 may exhibit a single mode, or may exhibit a bimodal or greater grain size distribution. In an embodiment, the plurality of diamond particles may include a relatively larger size and at least one relatively smaller size. As used herein, the phrases "relatively larger" and "relatively smaller" refer to particles sizes determined by any suitable method, which differ by at least a factor of two (e.g., 40 µm and 20 µm). In various embodiments, the diamond particles 118 may include a portion exhibiting a relatively larger size (e.g., 100 µm, 90 µm, 80 µm 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 10 µm, 15 µm, 12 µm, 10 µm, 8 µm, 4 µm, 2 µm, 1 µm, 0.5 µm, less than 0.5 µm, 0.1 µm, less than 0.1 µm). Of course, the diamond particles 118 may also include three or more different sizes (e.g., one relatively larger size and two or more relatively smaller sizes), without limitation. Examples of diamond particle size distributions for the diamond particles 118 are disclosed in U.S. Pat. Nos. 10,501,998 and 9,346,149. The disclosure of each of the foregoing patent applications is incorporated herein, in its entirety, by this reference.

In order to effectively HPHT sinter the mass of diamond particles 118, the mass of diamond particles 118 may be placed adjacent a surface of the substrate 120 to form an assembly 122. In an embodiment, the substrate 120 may be omitted and the assembly 122 include a disc of the catalyst material disposed adjacent to the mass of diamond particles 118, the mass of diamond particles 118 includes the catalyst material mixed therein, or no catalyst material is used. The assembly 122 may be placed in a pressure transmitting medium, such as a refractory metal can, graphite structure, pyrophyllite, combinations thereof, or another suitable container or supporting element. The pressure transmitting medium, including the assembly 122, may be subjected to an HPHT process at a temperature of at least about 1000° C. (e.g., about 1100° C. to about 2200° C., or about 1200° C. to about 1450° C.) and a pressure in the pressure transmitting medium of at least about 5 GPa (e.g., at least about 7.5 GPa, at least about 9.0 GPa, at least about 10.0 GPa, at least about 11.0 GPa, at least about 12.0 GPa, at least about 14.0, or about 7.5 GPa to about 9.0 GPa) for a time sufficient to sinter the diamond particles 118 and form a PCD body 100 bonded to the substrate 120 thereby forming the PDC 150.

During the HPHT process, the presence of a catalyst facilitates intergrowth between the mass of diamond particles 118 and forms the PCD body 100 including directly bonded-together diamond grains (e.g., exhibiting $sp^3$ bonding) defining a plurality of interstitial regions. In the illustrated embodiment, the PDC 350 may be formed by sintering the mass of diamond particles 118 on the substrate 120, which may be a cobalt-cemented tungsten carbide substrate. For example, cobalt and/or a cobalt alloy from the substrate 120 liquefies during the HPHT process and infiltrates into the mass of diamond particles 118 to catalyze formation of the PCD body 100. In such an example, some tungsten and/or tungsten carbide (metallic infiltrants) from the substrate 120 may dissolve in or otherwise transfer or alloy with the catalyst. However, in other embodiments, the catalyst may be mixed with the mass of diamond particles 118, provided from a thin foil, another external source, combinations of the foregoing, or no catalyst at all. Additionally, the catalyst and the metallic infiltrants may react with the mass of diamond particles 118 to form carbides. As such, the interstitial regions of the PCD body 100 may be at least partially occupied by at least one interstitial constituent (e.g., at least one of a metal-solvent catalyst, a metallic infiltrant, one or more formed carbides etc.).

The PCD body 100 so formed may include an interfacial surface 124 bonded to the substrate 120. Examples of interfacial surface geometries for the substrate 120 that may be bonded to the interfacial surface 124 are disclosed in U.S. Pat. No. 8,297,382, the disclosure of which is incorporated herein, in its entirety, by this reference. In an embodiment, the sintered grains of the PCD body 100 may exhibit an average grain size of about 20 μm or less or about 30 μm or less. For example, the average grain size and grain size distribution of the PCD body 100 may be substantially similar or the same as the average diamond particle size and distribution of the mass of diamond particles 118.

Examples of suitable HPHT process conditions that may be used to form any of the PDC embodiments disclosed herein are disclosed in U.S. Pat. No. 7,866,418 which is incorporated herein, in its entirety, by this reference.

When the HPHT sintering pressure is about 7.5 GPa in combination with the precursor average diamond particle size being less than 30 μm, at least an unleached portion of the PCD body 100 defined collectively by the bonded diamond grains and the metal-solvent catalyst may exhibit a coercivity of about 115 Oe or more and a metal-solvent catalyst content of less than about 7.5 wt % as indicated by a specific magnetic saturation of about 15 G·cm$^3$/g or less. In a more detailed embodiment, the coercivity may be about 115 Oe to about 250 Oe and the specific magnetic saturation of the PCD body 100 (prior to being leached) may be greater than 0 G·cm$^3$/g to about 15 G·cm$^3$/g. In an even more detailed embodiment, the coercivity may be about 115 Oe to about 175 Oe and the specific magnetic saturation of the PCD body 100 may be about 5 G·cm$^3$/g to about 15 G·cm$^3$/g. In yet an even more detailed embodiment, the coercivity and specific magnetic saturation of the PCD body 100 (prior to being leached) may be about 155 Oe to about 175 Oe and about 10 G·cm$^3$/g to about 15 G·cm$^3$/g, respectively. The specific permeability (i.e., the ratio of specific magnetic saturation to coercivity) of the unleached portions of the PCD body 100 may be about 0.10 or less, such as about 0.060 G·cm$^3$/g·Oe to about 0.090 G·cm$^3$/g·Oe. In some embodiments, despite the average grain size of the bonded diamond grains being less than about 30 μm, the metal-solvent catalyst content in the PCD body 100 (prior to being leached) may be less than about 7.5 wt % (e.g., about 3 wt % to about 6 wt % or about 1 wt % to about 3 wt %) resulting in a desirable thermal stability.

After the HPHT process, the PCD body 100 may be at least partially leached to remove at least a portion of the at least one interstitial constituent therefrom. In an embodiment, the PDC 350 may be at least partially immersed in and/or exposed to a leaching agent (e.g., hydrofluoric acid, nitric acid, a supercritical fluid, a gaseous leaching agent, another suitable leaching agent, or combinations thereof) to at least partially remove at least one interstitial constituent from the PCD body 100 to form a leached region. Removing at least a portion of the at least one interstitial constituent from the PCD body 100 may improve the wear resistance, heat resistance, thermal stability, or combinations thereof of the PCD body 100, particularly in situations where the PCD body 100 may be exposed to elevated temperatures. In an embodiment, the PCD body 100 may only be partially leached to maintain the metallurgical bond between the substrate 120 and the PCD body 100. However, in other embodiments, a PCD body 100 may be removed from a substrate 120 to which it was bonded during HPHT sintering. Such a configuration may allow the PCD body 100 to be completely leached, which may improve the thermal stability of the PCD body 100.

Explaining further, after the HPHT process, the substrate 120 may be removed from the PCD body 100. The substrate 120 may be removed from the PCD body 100 before, during, or after at least one of leaching the PCD body 100 and/or forming the threads 110 on the PCD body 100. The substrate 120 may be removed from the PCD body 100 by one or more of dissolving the substrate 120 (e.g., while leaching the PCD body 100), grinding away the substrate 120, electro-discharge machining ("EDM") processes (wire EDM or plunge EDM), laser ablation, grinding, and/or any other suitable technique. In some embodiments, the substrate 120 may not be removed from the PCD body 100.

The threads 110 may be formed in the PCD body 100 using any suitable technique. In an embodiment, the threads 110 may be at least partially formed during the HPHT process. In an example, the pressure transmitting medium or other container that the mass of diamond particles 118 are disposed in may be configured as a mold. The surfaces of the mold that contact the mass of diamond particles 118 may include a negative of the threads 110. In other words, the surfaces of the mold that contact the mass of diamond particles 118 may include valleys and peaks that form the peaks 112 and valleys 114, respectively, of the threads 110. For instance, the mass of diamond particles 118 may form a shape that corresponds to at least the contours of the surfaces of the mold. During the HPHT process, the diamond grains are bonded together which locks the shape of the mass of diamond particles 118 thereby forming the threads 110. In an example, the assembly 122 includes a sacrificial material disposed in the pressure transmitting medium along with the mass of diamond particles 118. The sacrificial material may form and fill at least the valleys 114 of the threads 110. In other words, the PCD body 100 includes the sacrificial material disposed in the valleys 114 of the threads 110. The sacrificial material may be configured to be more easily removed from the PCD body 100 than the bonded diamond grains. For instance, the sacrificial material may include a material that is less hard than the diamond grains which makes the sacrificial material easier to remove from the PCD body 100 during machining techniques (e.g., mechanical machining, grinding, EDM, or laser ablation) or may be formed from a material that is easily dissolved during the leaching process. Examples of sacrificial materials include tungsten carbide, refractory metals, ceramics, or other materials used in HPHT processes.

In an embodiment, the threads 110 may be formed using a machining process after the HPHT process. In an example, the threads 110 may be formed using plunge electrical discharge machining ("EDM"). In such an example, an electrode exhibiting a shape that generally corresponds to the valleys 114 may move towards the PCD body 100 to remove portions of the PCD body 100. The portions removed from the PCD body 100 may form at least the valleys 114. The PCD body 100 may be mounted on a device that rotates and otherwise moves the PCD body 100 relative to the electrode since it may be easier to rotate and otherwise move the PCD body 100 than the device that includes the electrode. In an example, the threads 110 may be formed suing an electrical discharge grinder. In such an example, an electrode in the forms of a spinning wheel may be moved proximate to portions of the PCD body 100 that are to be removed therefrom. The spinning wheel may include one or more protrusions that correspond in shape to the valleys 114. The spinning wheel may cause an electrical discharge that removes portions of the PCD body 100 to form at least the valleys 114. The PCD body 100 may be mounted on a device that rotates and otherwise moves the PCD body 100 relative to the spinning wheel since it may be easier to rotate and other move the PCD body 100 than the device that includes the spinning wheel. In an example, the threads 110 may be formed using a grinding or "turning the thread" technique. However, forming the threads 110 using grinding or "turning the thread" techniques may be difficult since, due to the hardness of the diamond grains of the PCD body 100, the machining medium is likely to be removed at the same or greater rate than the PCD body 100. In an example, the threads 110 may be formed using water jetting or wire EDM.

In an embodiment, the threads 110 may be formed in the PCD body 100 by lasing the PCD body 100 with a laser device to remove portions therefrom. In an example, the laser device may be positioned such that a laser omitted thereby predominately cuts portions of the PCD body 100. The laser may cut portions of the PCD body 100 when the laser is generally oriented parallel (±30°) to the surface of the PCD body 100 that the laser illuminates. In an example, the laser may be configured to remove portions of the PCD body 100 by predominately ablating portions of the PCD body 100. The laser may ablate portions of the PCD body 100 when the laser is generally oriented perpendicular (±30°) to the surface of the PCD body 100 that the laser illuminates. It is noted that the laser may neither predominately cut or ablate the PCD body 100 (e.g., the angle that the laser illuminates the PCD body 100 is neither generally parallel or perpendicular to a surface of the PCD body 100). Further examples of techniques that may be used to lase the PCD body 100 are disclosed in U.S. patent application Ser. No. 16/084,469, and U.S. Pat. No. 9,062,505, the disclosures of each of which is incorporated herein, in its entirety, by this reference.

In an example, the PCD body 100 may be mounted to a device that rotates or otherwise moves the PCD body 100 relative to the laser device. In an example, the laser device may be configured to rotate relative to the PCD body 100. In either example, the angle between the laser and the surface of the PCD body 100 may remain relatively constant (e.g., ±20°). Maintaining the angle constant may improve the accuracy that the laser removes portions of the PCD body 100 since the mode (e.g., cut or ablate) of removing the PCD body 100 may not change.

In an example, the portions of the lateral surface 106 that includes the threads 110 formed thereon may be divided into sections and the laser device may be configured to remove portions of the PCD body 100 from one section before removing portions of the PCD body 100 in another section. Dividing the lateral surface 106 into sections may improve the accuracy of the laser device removing portions of the PCD body 100. For example, the lateral surface 106 may be divided into 2 or more sections, 3 or more sections, 4 or more sections, 5 or more sections, 6 or more sections, 7 or more sections, 8 or more sections, 9 or more sections, 10 or more sections, or in ranges of about 2-4 sections, 3-5 sections, 4-6 sections, 5-7 sections, 6-8 sections, 7-9 sections, or 8-10 sections. The number of portions that the lateral surface 106 is divided into may depend on the laser device, the mode that the laser device uses to remove portions of the PCD body 100, and the desired accuracy. In an example, each section may include a portion of the circumference of the lateral surface 106.

In an embodiment, any technique (or any combination of techniques) disclosed herein for forming the threads 110 may be used to shape and/or polish portions of the PCD body 100 that are distinct from the threads 110.

In an embodiment, the PCD body 100 may include a bottom chamfer 117 extending from the bottom surface 104 to the lateral surface 106. The bottom chamfer 117 may facilitate insertion of the PCD body 100 into a recess since there is no corner between the bottom surface 104 and the lateral surface 106 that may catch on the component when attaching the PCD body 100 to the component. The bottom chamfer 117 may or may not include one or more threads 110 formed thereon.

The PCD bodies disclosed herein may exhibit a shape other than the shape illustrated in FIGS. 1A and 1B. For example, FIG. 2 is a side elevational view of a PCD body 200, according to an embodiment. Except as otherwise disclosed herein, the PCD body 200 may include one or more features that are the same or substantially similar to any of the PCD bodies disclosed herein. For example, the PCD body 200 may include a top surface 202, a bottom surface 204 opposite the top surface 202, and a plurality of diamond grains bonded together.

The illustrated embodiment, the PCD body 200 includes at least one first lateral surface 206a and at least one second lateral surface 206b. The first lateral surface 206a extends from or near the top surface 202 and the second lateral surface 206b extends from or near the bottom surface 204. The PCD body 200 also include at least one intermediate surface 226 extending between the first and second lateral surfaces 206a, 206b.

The PCD body 200 includes a main body 230 and a protrusion 232 extending therefrom. The main body 230 of the PCD body 200 is partially defined by the top surface 202, the first lateral surface 206a, and the intermediate surface 226. The main body 230 exhibits a first lateral dimension (e.g., diameter) extending between opposing portions of the first lateral surface 206a. The protrusion 232 is partially defined by the bottom surface 204 and the second lateral surface 206b. The protrusion 232 exhibits a second maximum lateral dimension (e.g., diameter) measured between opposing portions of the second lateral surface 206b. The second lateral dimension is smaller than the first lateral dimension. In some embodiments, the second lateral dimension is larger than the first lateral dimension.

At least a portion (e.g., all) of second lateral surface 206b may include one or more threads 210 formed thereon. The threads 210 allow the PCD body 200 to be threadedly attached to a component. The threads 210 may include one or more features that are the same or substantially similar to any of the threads disclosed herein and may be formed according to any of the methods disclosed herein. The first lateral surface 206a may also include one or more threads formed thereon (not shown).

The protrusion 232 may be formed using any suitable technique. In an example, the protrusion 232 may be formed by disposing the mass of diamond particles that form the PCD body 200 into a mold (e.g., pressure transmitting medium or other container) that exhibits a shape that generally corresponds to the negative shape of the PCD body 200. In such an embodiment, the protrusion 232 and the PCD body 200 are integrally formed with each other. For instance, the mold may include a wider region that corresponds to the main body 230, a narrower region that corresponds to the protrusion 232, and a step therebetween that corresponds to the intermediate surface 226. In an example, the protrusion 232 may be formed using a sacrificial material. In an example, the protrusion 232 may be formed by removing portions of the PCD body 200 to form the protrusion 232 using machining (e.g., EDM, grinding, lasing, etc.) techniques.

The protrusion 232 may reduce the quantity of diamond particles that are required to form the PCD body 200 relative to a substantially cylindrical PCD body that exhibits the same maximum lateral dimension as the first maximum lateral dimension of the main body 230. The protrusion 232 may also facilitate attachment of the PCD body 200 to the component. For example, the protrusion 232 may be inserted into cavities formed in the component that are too small to receive a substantially cylindrical PCD body that exhibits the same maximum lateral dimension as the first maximum lateral dimension of the main body 230. The smaller cavities that are configured to receive the protrusion 232 may be easier to form since a smaller quantity of the component needs to be removed to receive the protrusion 232. The protrusion 232 may also allow for greater flexibility in the selection of the PCD body 200 that is attached to the component. For example, the cavity of the component may be configured to receive a substantially cylindrical PCD body. However, it may be desirable to use a PCD body that exhibits a larger top surface than the substantially cylindrical PCD body. The protrusion 232 allows the size of the top surface to be increased without modifying the cavity of the component.

The intermediate surface 226 (e.g., intermediate annular surface) may abut a surface of the component when the PCD body 200 is attached to the component, for example, to prevent over-insertion of the PCD body 200 into the component and/or to provide additional support for the PCD body 200. As such, the intermediate surface 226 may generally correspond to the shape of a portion of the component that receives that PCD body 200. In an example, the intermediate surface 226 may be generally parallel to the top surface 202 when the surface of the component that abuts the intermediate surface 226. In an example, the intermediate surface 226 may be curved when the surface of the component that abuts the intermediate surface 226 is curved (e.g., the component is a support ring for a radial bearing assembly). In some embodiments, the intermediate surface 226 may not correspond to the shape of the surface of the component that abuts the intermediate surface 226.

Any corner of the PCD body 200 may exhibit a radius, fillet, or chamfer. For example, at least one of the corner where the top surface 202 meets the lateral surface 206a, the corner where the lateral surface 206a meets the intermediate surface 226, the corner where the lateral surface 206b meets the intermediate surface 226, or the corner where the bottom surface 204 meets the lateral surface 206b may exhibit a radius, fillet, or chamfer.

Figure 3A:
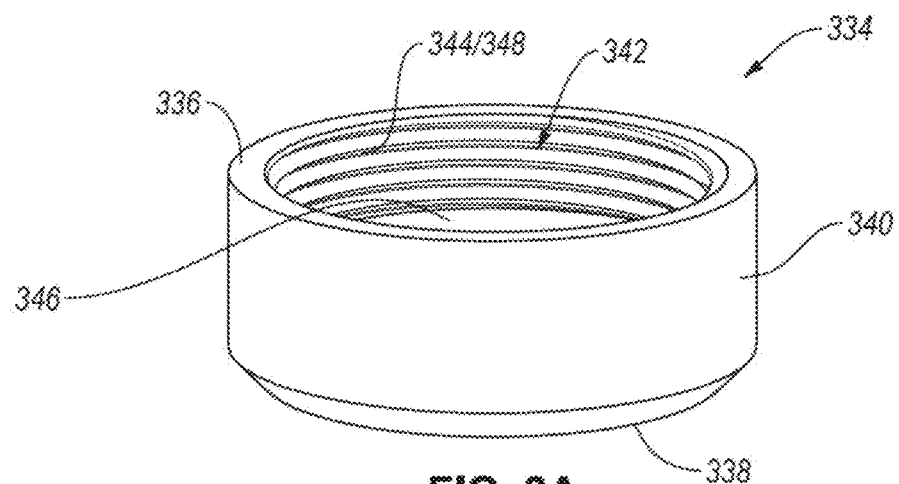
FIG. 3A is an isometric view of a substrate that is configured to receive any of the PCD bodies disclosed herein, according to an embodiment.

As previous discussed, the PCD body disclosed herein may be configured to be attached to a component. The component may include, for example, a substrate (e.g., cemented carbide substrate), a bit body, a support ring, or any other structure that may receive a PCD body. For example, FIG. 3A is an isometric view of a substrate 334 that is configured to receive any of the PCD bodies disclosed herein. The substrate 334 is configured to be attached to any of the PCD bodies disclosed herein to form a PDC (shown in FIGS. 3B and 3C). Threadedly attaching the PCD body to the substrate 334 may mitigate issues caused by metallurgically bonding or brazing the PCD body to the substrate, as previously discussed herein.

The substrate 334 may be configured to indirectly attach the PCD body to secondary component. The secondary component may include any component that a PDC may be attached to that is distinct from the substrate 334. Examples of the secondary component includes a drilling bit body or a support ring. Indirectly attaching the PCD body to the secondary component via the substrate 334 may allow the PCD body to be attached to a secondary component that is configured to receive conventional PDCs (e.g., PDCs that include a threadless PCD body) while also allowing the PCD body to be easily detached from the substrate 334. The substrate 334 may be threadedly attached to (e.g., the substrate 334 includes component threads), interference fitted, or brazed to the secondary component The substrate 334 includes a substrate top surface 336, a substrate bottom surface 338 opposite the substrate top surface 336, and at least one substrate lateral surface 340 extending between the substrate top surface 336 and the substrate bottom surface 338. The substrate 334 may optionally include one or more chamfers. In an embodiment, the substrate 334 may be formed from a cemented carbide substrate, such as a cobalt-cemented tungsten carbide substrate. In an embodiment, the substrate 334 may be formed from a material other than a cemented carbide substrate (e.g., steel) since the substrate 334 is not metallurgically bonded to the PCD body.

The substrate 334 defines a cavity 342 that is sized and shape to receive at least a portion of any of the PCD bodies disclosed herein. The cavity 342 may extend from the substrate top surface 336 of the substrate 334 and into the substrate 334. The cavity 342 may be partially defined by at least one cavity lateral surface 344 and, when the cavity 342 does not extend completely through the substrate 334, a substrate bottom surface 346. The substrate bottom surface 346 may be spaced from the substrate top surface 336 and the cavity lateral surface 344 may extend from or near the substrate top surface 336 of the substrate 334 to or near the substrate bottom surface 346.

The substrate 334 exhibits a thickness between the substrate lateral surface 340 and the cavity lateral surface 344 (i.e., a portion of the cavity lateral surface 344 that does not include the component threads 348 or from the peaks of the component threads 348), as previously discussed herein. The thickness between the substrate lateral surface 340 and the cavity lateral surface 344 may be about 1 mm to about 3 mm, about 2 mm to about 4 mm, about 3 mm to about 5 mm, about 4 mm to about 6 mm, about 5 mm to about 7 mm, about 6 mm to about 8 mm, about 7 mm to about 9 mm, about 8 mm to about 1 cm, about 9 mm to about 1.2 cm, about 1 cm to about 1.5 cm, about 1.25 cm to about 1.75 cm, about 1.5 cm to about 2 cm, about 1.75 cm to about 2.5 cm, or greater than about 2 cm. The thickness of the substrate 334 between the substrate lateral surface 340 and the cavity lateral surface 344 may depend on the depth of the component threads 348 and the expected forces that are to be applied to the PCD body attached to the substrate 334 during use.

At least a portion of the cavity lateral surface 344 may include one or more component threads 348. The component threads 348 are configured to correspond to and be threadedly attached to the threads of a PCD body (e.g., the PCD body 100 as show in FIG. 3B and/or the PCD body 100 as shown in FIG. 3C). For example, the component threads 348 may include a plurality of peaks and valleys. The peaks of the component threads 348 are configured to be positioned within the valleys of the threads and the valleys of the component threads 348 are configured to receive the peaks of the threads. The properties of the component threads 348 may be selected to match or generally correspond to the properties of the threads that the component threads 348 are configured to be threadedly attached. In an example, the component threads 348 may exhibit a pitch, depth, truncation, and/or type (e.g., API threads) that generally corresponds to the pitch, depth, truncation, and/or type of the threads, respectively. In other words, the component threads 348 may exhibit any of the pitches, depth, truncations, and/or type of threads disclosed herein. The component threads 348 exhibit a major diameter that is the smallest diameter of a cylinder that touches the peaks of the component threads 348 and a minor diameter that is the largest diameter of a cylinder that touches the valleys of the component threads 348. The major diameter and the minor diameter of the component threads 348 generally correspond to (e.g., is the same as, slightly smaller than, or slightly larger than) the minor diameter and the major diameter, respectively, of the threads to which the substrate 334 is configured to be attached.

Figure 3B:
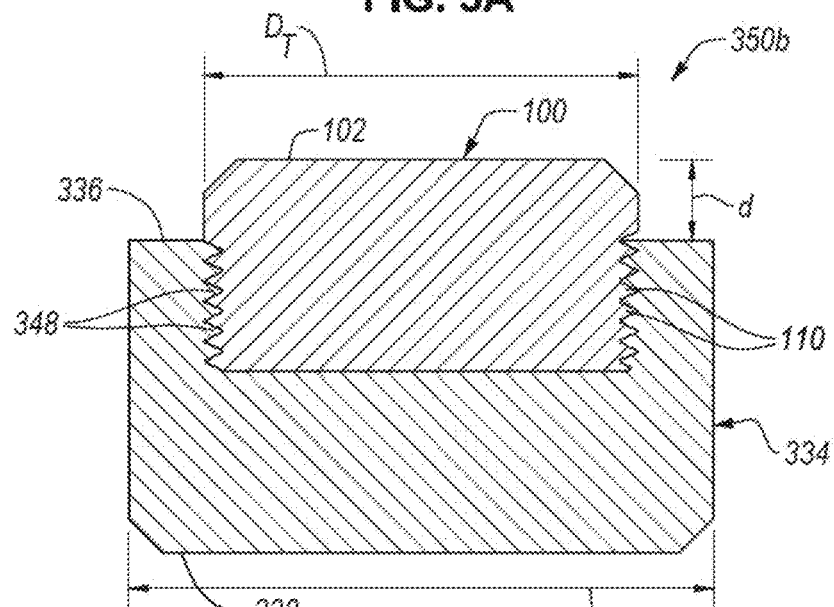
FIG. 3B is a cross-sectional schematic of a PDC that includes the PCD body illustrated FIG. 1A threadedly attached to the substrate illustrated in FIG. 3A, according to an embodiment.
Figure 3C:
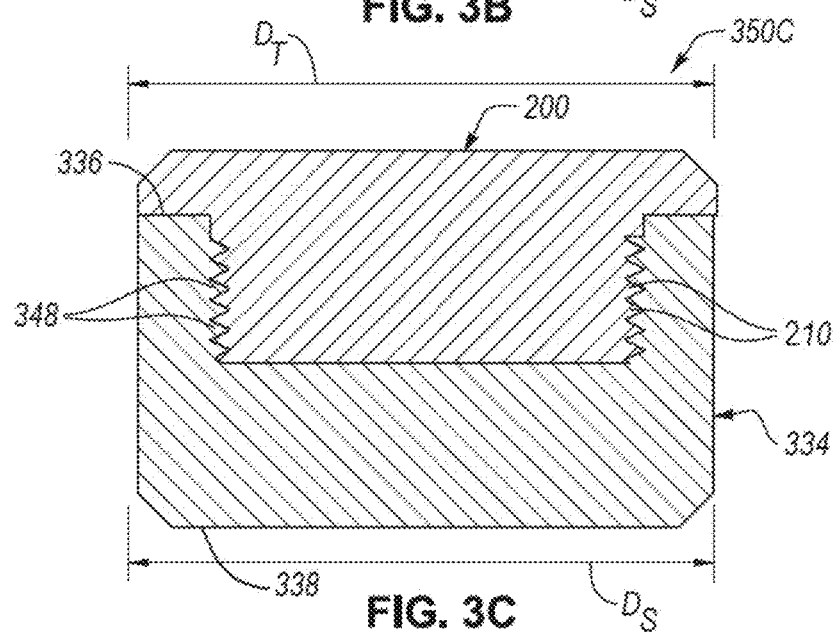
FIG. 3C is a schematic cross-sectional view of a PDC that include the PCD body illustrated in FIG. 2 threadedly attached to the substrate illustrated in FIG. 3A, according to an embodiment.

FIG. 3B is a cross-sectional schematic of a PDC 350b (e.g., an apparatus) that includes the PCD body 100 illustrated FIG. 1A threadedly attached to the substrate 334 illustrated in FIG. 3A, according to an embodiment. As illustrated, the PCD body 100 is disposed in the cavity 342 (shown in FIG. 3A) defined by the substrate 334. The threads 110 and the component threads 348 interact with each other such that the PCD body 100 is securely attached to the substrate 334.

In an embodiment, the top surface 102 of the PCD body 100 may be generally level or substantially coplanar with the substrate top surface 336. In an embodiment, the top surface 102 of the PCD body 100 may be spaced from the substrate top surface 336 by a distance d which may decrease the amount of wear on the substrate 334 than if the top surface 102 of the PCD body 100 was even with the substrate top surface 336. The distance d also allows the PCD body 100 to be gripped with pliers, wrenches, or other tools. The distance d may be selected to be greater than about 1 mm, greater than about 2 mm, greater than about 3 mm, greater than about 4 mm, greater than about 5 mm, greater than about 6 mm, greater than about 8 mm, greater than about 1 cm, greater than about 1.25 cm, greater than about 1.5 cm, greater than about 1.75 cm, greater than about 2 cm, or in ranges of about 1 mm to about 3 mm, about 2 mm to about 4 mm, about 3 mm to about 5 mm, about 4 mm to about 6 mm, about 5 mm to about 8 mm, about 6 mm to about 1 cm, about 8 mm to about 1.25 cm, about 1 cm to about 1.5 cm, about 1.25 cm to about 1.75 cm, or about 1.5 cm to about 2 cm. In some embodiments, the distance d may be less than 1 mm, such as 0 mm when the top surface 102 of the PCD body 100 is flush with the top surface 336 of the substrate 334.

In the illustrated embodiment, the PCD body 100 exhibits a first maximum lateral dimension $D_T$ and the substrate 334 exhibits a second maximum lateral dimension $D_S$. As illustrated, the first maximum lateral dimension $D_T$ is less than the second maximum lateral dimension $D_S$. The second maximum lateral dimension $D_S$ is greater than the first maximum lateral dimension $D_T$ because the substrate 334 requires a thickness between the substrate lateral surface 340 and the cavity lateral surface 344, as previously discussed herein. The fact that the first maximum lateral dimension $D_T$ is less than the second maximum lateral dimension $D_S$ causes a portion substrate top surface 336 to be exposed during operation. Exposing a portion of the substrate top surface 336 may increase wear on the substrate 334.

FIG. 3C is a schematic cross-sectional view of a PDC 350c (e.g., an apparatus) that include the PCD body 200 illustrated in FIG. 2 threadedly attached to the substrate 334 illustrated in FIG. 3A, according to an embodiment. As illustrated, the protrusion 232 the PCD body 200 is disposed in the cavity 342 (shown in FIG. 3A) defined by the substrate 334. The threads 210 and the component threads 348 interact with each other such that the PCD body 200 is securely attached to the substrate 334.

The PCD body 200 exhibits a first maximum lateral dimension $D_T$ and the substrate 334 exhibits a second maximum lateral dimension $D_S$. In an embodiment, as illustrated, the first maximum lateral dimension $D_T$ and the second maximum lateral dimension $D_S$ are substantially the same. As such, the PCD body 200 covers substantially all of the substrate top surface 336 thereby minimizing wear on the substrate 334 during operation. In an embodiment, not shown, the second maximum lateral dimension $D_S$ may be greater than the first maximum lateral dimension $D_T$. In such an embodiment, the substrate top surface 336 may be exposed during use which may increase the wear on the substrate 334. In an embodiment, the first maximum lateral dimension $D_T$ is greater than the second maximum lateral dimension $D_S$. These three embodiments illustrate how the protrusion 232 of the PCD body 200 allows the PCD body 200 to be attached to different components that may not be specifically configured to receive such a PCD body 200.

Figure 4:
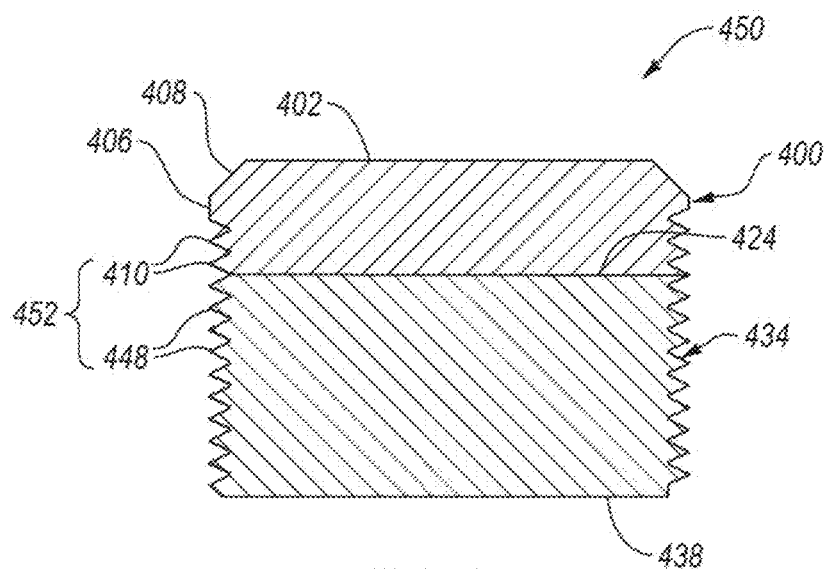
FIG. 4 is schematic cross-section of a PDC, according to an embodiment.

In some embodiments, the PCD bodies disclosed herein may be non-threadedly attached to a substrate. For example, FIG. 4 is schematic cross-section of a PDC 450, according to an embodiment. The PDC 450 includes a PCD body 400 and a substrate 434. Except as otherwise disclosed herein the PCD body 400 and the substrate 434 are the same or substantially similar to any of the PCD bodies and substrates, respectively, disclosed herein. The PCD body 400 is metallurgically bonded or brazed to the substrate 434 along an interfacial surface 424 thereof. The PDC 450 includes a top surface 402, a bottom surface 438 opposite the top surface 402, at least one lateral surface 406 extending between the top and bottom surfaces 402, 438, and, optionally, at least one chamfer 408.

The PDC 450 includes one or more threads 452 formed on at least a portion of the lateral surface 406. The threads 452 are configured to threadedly attach the PDC 450 to a secondary component that is distinct from the substrate 434, such as a drill bit body or a support ring. For example, the secondary component may include one or more component threads that are configured to interact with the threads 452, thereby threadedly attaching the PDC 450 to the secondary component.

The threads 452 may include one or more threads 410 formed on at least a portion of the lateral surface 406 defined by the PCD body 400 and/or one or more substrate threads 448 formed on at least a portion of the lateral surface 406 defined by the substrate 434. The threads 410 and the substrate threads 448 may include one or more features that are the same or substantially similar to any of the threads disclosed herein. The threads 410 and the substrate threads 448 may be aligned with and exhibit complementary geometries (e.g., pitch, major diameter, etc.) as each other which allows the threads 410 and the substrate threads 448 to interact with the same threads on the secondary component. The threads 452 (e.g., at least one of the threads 410 or the substrate threads 448) may be formed using any of the techniques (or combinations thereof) disclosed herein.

Except as otherwise disclosed herein, the PDC 450 may be formed according to any of the methods disclosed herein. For example, an assembly is disposed in a pressure transmitting medium. The assembly includes a mass of diamond particles and, optionally, a substrate. The assembly may include at least one catalyst material (e.g., metal-solvent catalyst, alkali metal carbonates, alkaline earth metal carbonates, etc.) at least one of disposed in the substrate, in the form of a disc of catalyst material, or mixed with the mass of diamond particles. The assembly is then subjected to an HPHT process configured to cause diamond-to-diamond bonding. In an embodiment, when the assembly includes the substrate 434, the HPHT process may metallurgically bond the substrate 434 to the PCD body 400 thereby forming the PDC 450. In an embodiment, the substrate disposed in the assembly is distinct from the substrate 434 of the PDC 450. In such an embodiment, the substrate that was disposed in the assembly may be removed from the PCD body 400, for example, via grinding. The PCD body 400 may then be attached to the substrate 434 in a second HPHT process or via brazing to form the PDC 450. In an embodiment, the assembly does not include a substrate. In such an embodiment, the PCD body 400 may be attached to the substrate 434 in a second HPHT process or via brazing to form the PDC 450.

Figure 5:
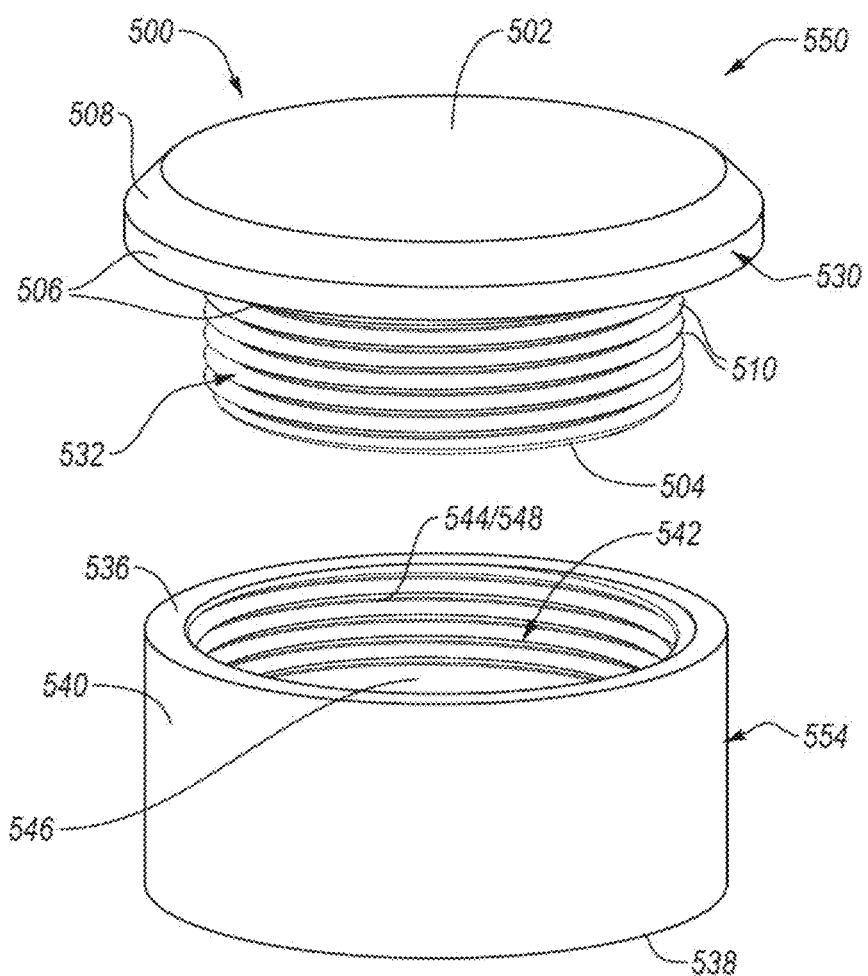
FIG. 5 is an exploded isometric view of an apparatus that includes at least two PCD materials, according to an embodiment.

As previously discussed, the component to which any of the PCD bodies disclosed herein may be attached may be distinct from the substrate. In an embodiment, the component to which any of the PCD bodies disclosed herein are attached to may include a PCD component that is distinct from the PCD body. For example, FIG. 5 is an exploded isometric view of an apparatus 550 that includes at least two PCD materials, according to an embodiment. Except as otherwise disclosed herein, the at least two PCD materials of the apparatus 550 may be the same as or substantially similar to any of the PCD materials (i.e., PCD bodies) disclosed herein. For simplicity and brevity, the top PCD material will be referred to as the PCD body 500 and the bottom PCD material will be referred to as the PCD component 554. As such, as discussed herein, the PCD body 500 includes the male threaded connector and the PCD component 554 includes the female threaded connector. However, it is noted that the top PCD material may be the PCD component 554 and the bottom PCD material may be the PCD body 500.

The PCD body 500 includes a top surface 502, a bottom surface 504 opposite the top surface 502, at least one lateral surface 506, and, optionally, at least one chamfer 508. The PCD body 500 also includes at least one threads 510 formed on at least a portion of the at least one lateral surface 506. In an embodiment, as illustrated, the PCD body 500 includes a main body 530 and a protrusion 532 extending from the main body 530, similar to the PCD body 200 illustrated in FIG. 2. In an embodiment, the PCD body 500 may exhibit a generally cylindrical shape (i.e., does not include the protrusion 532 extending from the main body 530) similar to the PCD body 100 illustrated in FIG. 1A.

The PCD component 554 includes a component top surface 536, a component bottom surface 538, at least one component lateral surface 540 extending between the component top surface 536 and the component bottom surface 538, and, optionally, at least one chamfer (not shown). The PCD component 554 defines a cavity 542. The cavity 542 is partially defined by at least one cavity lateral surface 544 that extends from or near the component top surface 536 towards the body bottom surface 538. At least a portion of the cavity lateral surface 544 includes one or more component threads 548 formed thereon. The component threads 548 are configured to interact with the threads 510 such that the PCD body 500 may be threadedly attached to the PCD component 554. In an embodiment, as illustrated, the cavity 542 only extends partially through the PCD component 554. In such an embodiment, the cavity 542 is also partially defined by a cavity bottom surface 546 that is spaced from the component top surface 536 and the body bottom surface 538 and the cavity lateral surface 544 extends from or near the component top surface 536 to or near the cavity bottom surface 546. In an embodiment, the cavity 542 extends completely through the PCD component 554.

The PCD component 554 may be formed using any of the methods disclosed herein. For example, the PCD component 554 may be formed according to the method illustrated in FIG. 1B. In such an example, a mass of diamond particles may be disposed in a pressure transmitting assembly and subject to an HPHT process. The cavity 542 and the component threads 548 may be formed using a mold, a sacrificial material, plunge EDM, grinding, or any other suitable method.

Threadedly attaching the PCD body 500 to the PCD component 554 may help resolve several issues associated with the manufacturing of PCD materials. In an example, as previously discussed, conventional PCD bodies are often metallurgically bonded to substrates which may adversely affect the thermal stability of the conventional PCD body. The PCD component 554 may be metallurgically bonded to a substrate (not shown) and, thus, the PCD component 554 may include an infiltrant disposed therein that compromises the thermal stability of the PCD component 554. The PCD body 500 may have be substantially free of infiltrants that compromise the thermal stability thereof (e.g., leached). The threads 510 and component threads 548 allows the PCD body 500 to be threadedly attached to the PCD component 554 and the substrate without re-introducing infiltrants into the PCD body 500 or requiring brazing the PCD body 500 to the PCD component 554. As previously discussed, the PCD body 500 and the PCD component 554 may be reversed. As such, the PCD body 500 may be metallurgically bonded to the substrate and the PCD component 554 may be substantially devoid of infiltrants.

In an example, the apparatus 550 (e.g., PCD body 500 and the PCD component 554 collectively) may exhibit a thickness that is greater than is possible with a single PCD material. For example, using an HPHT process, a single PCD material may exhibit a maximum thickness of 24 mm measured from a top surface to a bottom surface thereof. Further, increasing the width (e.g., diameter) of the single PCD material that is measured between lateral surface(s) thereof a may also require a decrease in the thickness of the single PCD material. For instance, a single PCD material exhibiting a width of about 75 mm may exhibit a maximum thickness of about 5 mm and a PCD material exhibiting a width of about 13 mm may exhibit a maximum thickness of about 18 mm. However, apparatus 550 may exhibit a thickness that is greater than about 5 mm, greater than about 10 mm, greater than about 15 mm, greater of about 20 mm, greater than about 25 mm, greater than about 30 mm, greater than about 35 mm, greater than about 40 mm, greater than about 50 mm, greater than about 60 mm, greater than about 70 mm, greater than about 80 mm, greater than about 100 mm, such as in ranges of about 5 mm to about 15 mm, about 10 to about 20 mm, about 15 mm to about 25 mm, about 20 mm to about 30 mm, about 25 mm to about 35 mm, about 30 mm to about 40 mm, about 35 mm to about 50 mm, about 40 mm to about 60 mm, about 50 mm to about 80 mm, or about 60 mm to about 100, even when the width of at least a portion of the apparatus 550 is greater than 10 mm, greater than about 15 mm, greater than about 20 mm, greater than about 30 mm, greater than about 40 mm, greater than about 50 mm, greater than about 60 mm, greater than 70 mm, or in ranges of about 10 mm to about 20 mm, about 15 mm to about 30 mm, about 20 mm to about 40 mm, about 30 mm to about 50 mm, about 40 mm to about 60 mm, or about 50 mm to about 70 mm.

It is noted that the apparatus 550 may include three or more PCD materials configured to be threadedly attached together. For example, at least one of the PCD body 500 or the PCD component 554 may define an additional cavity or protrusion. The additional or protrusion may allow the PCD body 500 and/or PCD component 554 to be threadedly attached to another PCD material.

Figure 6:
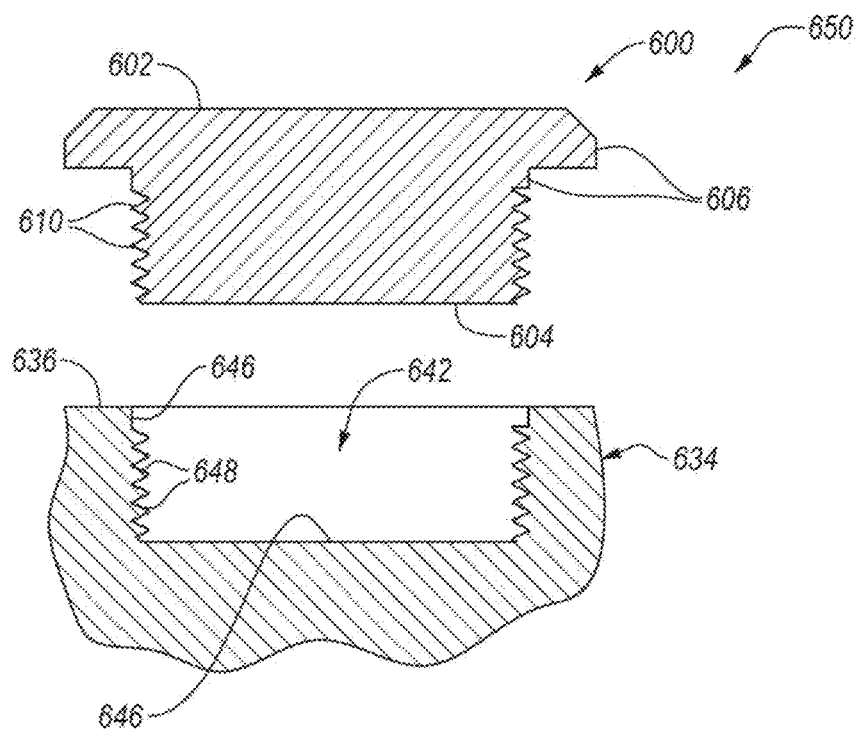
FIG. 6 is a cross-sectional schematic of a portion of an apparatus, according to an embodiment.

As previously discussed, the PCD bodies disclosed herein may be threadedly attached to other bodies. For example, FIG. 6 is a cross-sectional schematic of a portion of an apparatus 650, according to an embodiment. The apparatus 650 includes a PCD body 600 that is threadedly attached to a component 634. Except as otherwise disclosed herein, the PCD body 600 may include one or more features that are the same or substantially similar to any of the PCD bodies disclosed herein. For example, the PCD body 600 may include a top surface 602, a bottom surface 604, and at least one lateral surface 606 that includes one or more threads 610 formed on at least a portion thereof.

Except as otherwise disclosed herein, the component 634 may include one or more features that are the same or substantially similar to any of the components disclosed herein. For example, the component 634 may include a component top surface 636 and a cavity 642. The cavity 642 may be partially defined by a cavity bottom surface 646 spaced from the component top surface 636 and at least one cavity lateral surface 644 extending between the component top surface 636 and the cavity bottom surface 646. The component 634 may include one or more component threads 648 formed on at least a portion of the cavity lateral surface 644. The component threads 648 may be configured as any of the component threads disclosed herein and may be further configured to interact with the threads 610.

The component 634 may be a drill bit body, a support ring of a bearing assembly, or any other component that may be attached to the PCD body 600. The component 634 may be formed from any suitable material. For example, the component 634 may be formed from steel (e.g., stainless steel), another metal, a carbide material (e.g., tungsten carbide), another ceramic, or combinations thereof. The material that forms the component 634 may depend on the device that includes the component 634. For example, the component 634 may be formed from a relatively hard material, such as hardened steel or tungsten carbide when the component 634 forms part of a drill bit body due to the abrasive environment that component 634 is exposed.

Figure 7:
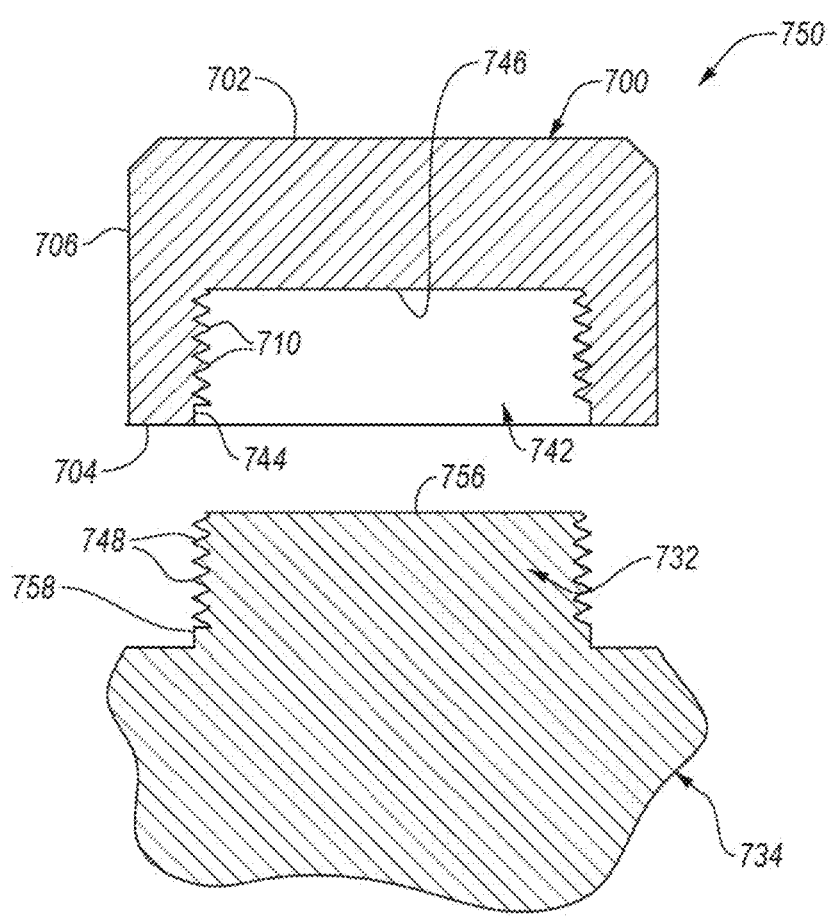
FIG. 7 is an exploded cross-sectional schematic of a portion of an apparatus, according to an embodiment.

In the embodiments disclosed above, the PCD body form a male threaded attachment and the components form a female threaded attachment. In such embodiments, the PCD body may form a male threaded attachment since it may be easier to form a cavity in the softer component than the harder PCD body. However, any of the PCD bodies disclosed herein may form a female threaded attachment and any of the components disclosed herein may form a male threaded attachment. For example, FIG. 7 is an exploded cross-sectional schematic of a portion of an apparatus 750, according to an embodiment. The apparatus 750 includes a PCD body 700 and a component 734. The PCD body 700 and the component 734 are configured to be threadedly attached together. Except as otherwise disclosed herein, the PCD body 700 and the component 734 may include one or more features that are the same or substantially similar to any of the PCD bodies and components, respectively, disclosed herein. For example, the PCD body 700 may include a top surface 702, a bottom surface 704, and at least one lateral surface 706 extending between the top and bottom surfaces 702. The component 734 is illustrated as being similar to the component 634 (e.g., a bit body or a support ring) illustrated in FIG. 6. However, it is noted that the component 734 may include any of the components disclosed herein (e.g., a substrate or a PCD component).

The PCD body 700 defines a cavity 742 extending inwardly from bottom surface 704. The cavity 742 may include a cavity top surface 746 that is spaced from the bottom surface 704 and at least one cavity lateral surface 744 extending between the bottom surface 704 and the cavity top surface 746. The PCD body 700 includes one or more threads 710 formed on at least a portion of the cavity lateral surface 744. Accordingly, the one or more embodiments disclosed herein that a polycrystalline diamond body may comprise internal (as shown in FIGS. 5 and 7) and/or external threads (as shown in FIGS. 1A-2 and 4-6), without limitation.

The component 734 includes a protrusion 732 extending from the component top surface 736. The protrusion 732 is sized and shaped to fit within the cavity 742 defined by the PCD body 700. The protrusion 732 may be partially defined by a protrusion top surface 756 and at least one protrusion lateral surface 758. The component 734 includes one or more component threads 748 formed on at least a portion of the protrusion lateral surface 758. The component threads 748 are configured to interact with the threads 710. Thus, the PCD body 700 may be threadedly attached to the component 734 by inserting the protrusion 732 into the cavity 742 and rotating the PCD body 700 relative to the protrusion 732 such that the threads 710 and component threads 748 interact with each other.

The disclosed PCD bodies and PDC embodiments may be used in a number of different applications including, but not limited to, use in a rotary drill bit (FIGS. 8A and 8B), a thrust-bearing apparatus (FIG. 9), a radial bearing apparatus (FIG. 10), a mining rotary drill bit (e.g., a roof bolt drill bit), and a wire-drawing die. The various applications discussed above are merely some examples of applications in which the PDC embodiments may be used. Other applications are contemplated, such as employing the disclosed PDC embodiments in friction stir welding tools.

Figure 8A:
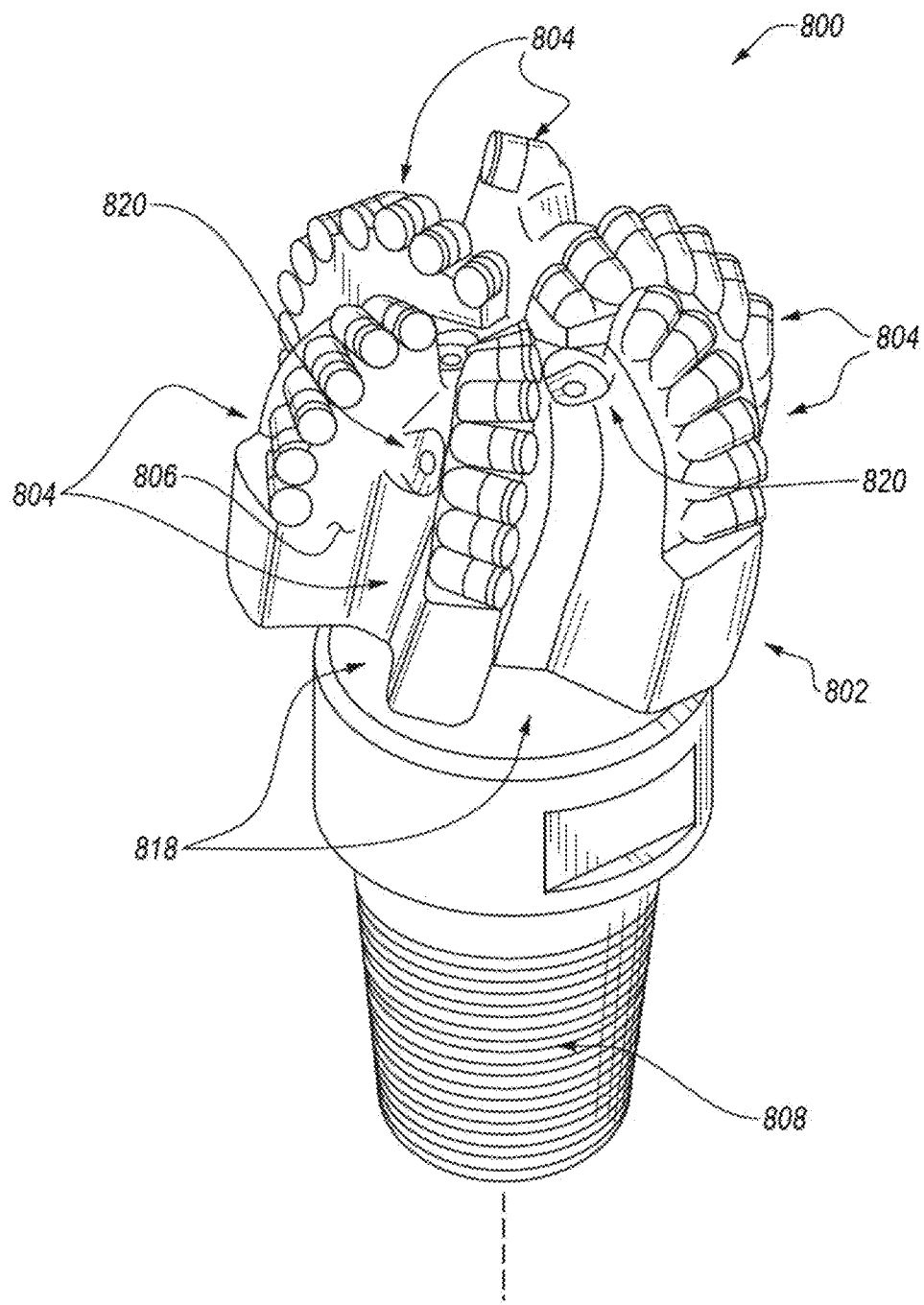
FIG. 8A is an isometric view and FIG. 8B is a top plan view of an embodiment of a rotary drill bit for use in subterranean drilling applications, such as oil and gas exploration, according to an embodiment.
Figure 8B:
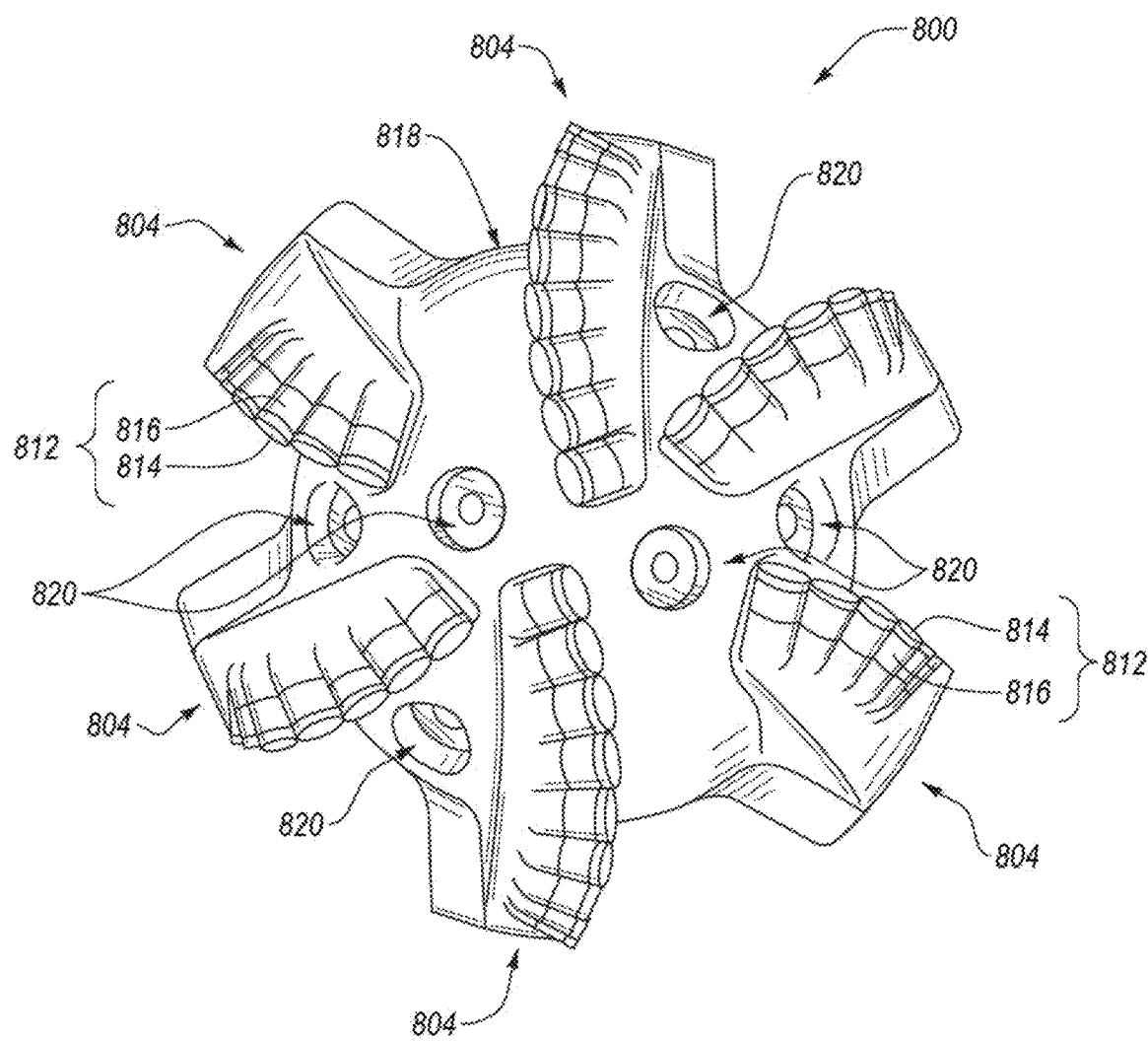

FIG. 8A is an isometric view and FIG. 8B is a top plan view of an embodiment of a rotary drill bit 800 for use in subterranean drilling applications, such as oil and gas exploration, according to an embodiment. The rotary drill bit 800 comprises a bit body 802 that includes radially and longitudinally extending blades 804 with leading faces 806, and a threaded pin connection 808 for connecting the bit body 802 to a drilling string. The bit body 802 defines a leading end structure for drilling into a subterranean formation by rotation about a longitudinal axis and application of weight-on-bit. At least one PCD body, configured according to any of the previously described embodiments, may be directly or indirectly (e.g., via a substrate) threadedly attached to the bit body 802.

The bit body 802 includes a plurality of PCD cutting elements 812 secured to the blades 804. At least one of the PCD cutting elements 812 includes any one of the PCD bodies disclosed herein. The PCD cutting elements 812 may be threadedly attached to the bit body 802 or otherwise attached to the bit body 802 when the PCD cutting elements 812 includes a PCD body threadedly attached to a substrate. In addition, if desired, at least one of the PCD cutting elements 812 may be conventional PDCs (e.g., a threadless PCD body bonded to a substrate) press fitted or brazed to the bit body 802. Also, circumferentially adjacent blades 804 define so-called junk slots 818 therebetween, as known in the art. Additionally, the rotary drill bit 800 may include a plurality of nozzle cavities 820 for communicating drilling fluid from the interior of the rotary drill bit 800 to the PDCs 812.

The rotary drill bit 800 may then be used in one or more subterranean drilling operations until at least one of the plurality of PCD cutting elements 812 spall ("spalled PCD"). Spalling of the PCD cutting elements 812 may be detected by sudden changes in force exerted by the plurality of PCD cutting elements 812 against a subterranean surface, visual inspection, audible cues, or combinations thereof, etc. After one or more PCD cutting elements 812 spall, the spalled PCD may be removed from the rotary drill bit 800, for instance, while the rotary drill bit 800 is in the field. For example, the spalled PCD may be removed from the rotary drill bit 800 by rotating the spalled PCD relative to the bit body 802. A new PCD cutting element may then be threadedly attached to the drill bit body 802, for instance, while the rotary drill bit 800 is in the field. The rotary drill bit 800 may then be used in subterranean drilling operations.

FIGS. 8A and 8B merely depict one embodiment of a rotary drill bit that employs at least one PCD cutting elements 812 fabricated and structured in accordance with the disclosed embodiments, without limitation. The rotary drill bit 800 is used to represent any number of earth-boring tools or drilling tools, including, for example, core bits, roller-cone bits, fixed-cutter bits, eccentric bits, bi-center bits, reamers, reamer wings, or any other downhole tool including superabrasive compacts, without limitation.

Figure 9:
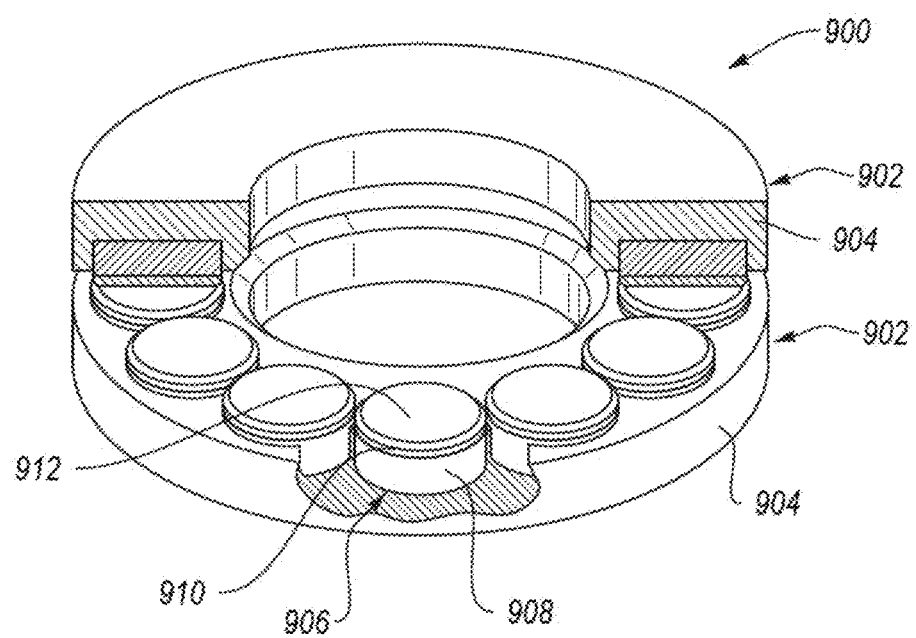
FIG. 9 is an isometric cut-away view of an embodiment of a thrust-bearing apparatus, which may utilize any of the disclosed PCD body embodiments as bearing elements, according to an embodiment.

FIG. 9 is an isometric cut-away view of an embodiment of a thrust-bearing apparatus 900, which may utilize any of the disclosed PCD body embodiments as bearing elements, according to an embodiment. The thrust-bearing apparatus 900 includes respective thrust-bearing assemblies 902. Each thrust-bearing assembly 902 includes an annular support ring 904 that may be fabricated from a material, such as carbon steel, stainless steel, or another suitable material. Each support ring 904 includes a plurality of recesses (not labeled) that receives a corresponding bearing element 906. At least one of the bearing element 906 includes a PCD body 910 including a bearing surface 912 and, optionally, a substrate 908. In an embodiment, at least one bearing element 906 includes the PCD body 910 directly threadedly attached to the support ring 904 (e.g., the substrate 908 is omitted). In an embodiment, at least one bearing element 906 includes the PCD body 910 threadedly attached to the substrate 908 and the substrate 908 may be threadedly attached, brazed, press-fitted, fastened using fasteners, or otherwise attached to the support ring 904. In an embodiment, the PCD body 910 is bonded or brazed to the substrate 908 and at least the substrate 908 is threadedly attached to the support ring 904.

In use, the bearing surfaces 912 of one of the thrust-bearing assemblies 902 bears against the opposing bearing surfaces 912 of the other one of the bearing assemblies 902. For example, one of the thrust-bearing assemblies 902 may be operably coupled to a shaft to rotate therewith and may be termed a "rotor." The other one of the thrust-bearing assemblies 902 may be held stationary and may be termed a "stator."

Figure 10:
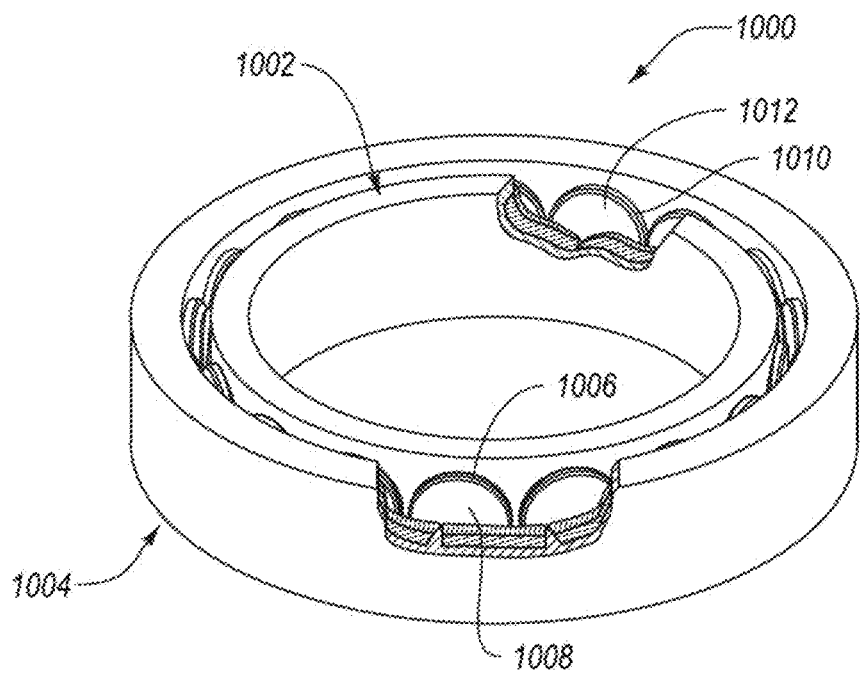
FIG. 10 is an isometric cut-away view of an embodiment of a radial bearing apparatus, which may utilize any of the disclosed PCD body embodiments as bearing elements, according to an embodiment.

FIG. 10 is an isometric cut-away view of an embodiment of a radial bearing apparatus 1000, which may utilize any of the disclosed PCD body embodiments as bearing elements, according to an embodiment. The radial bearing apparatus 1000 includes an inner race 1002 positioned generally within an outer race 1004. The outer race 1004 includes a plurality of bearing elements 1006 affixed thereto that have respective bearing surfaces 1008. The inner race 1002 also includes a plurality of bearing elements 1010 affixed thereto that have respective bearing surfaces 1012. One or more, or all of the bearing elements 1006 and 1010 may be configured according to any of the PCD body embodiments disclosed herein. For example, one or more of the bearing elements 1006 or 1010 may include a PCD body directly threadedly attached to the outer race 1004 or the inner race 1010, respectively, a PCD body threadedly attached to a substrate, or a PCD body bonded to a substrate and that substrate is threadedly attached to one of the races. The inner race 1002 is positioned generally within the outer race 1004 and, thus, the inner race 1002 and outer race 1004 may be configured so that the bearing surfaces 1008 and 1012 may at least partially contact one another and move relative to each other as the inner race 1002 and outer race 1004 rotate relative to each other during use.

The radial-bearing apparatus 1000 may be employed in a variety of mechanical applications. For example, so-called "roller cone" rotary drill bits may benefit from a radial-bearing apparatus disclosed herein. More specifically, the inner race 1002 may be mounted to a spindle of a roller cone and the outer race 1004 may be mounted to an inner bore formed within a cone and that such an outer race 1004 and inner race 702 may be assembled to form a radial-bearing apparatus.

The PDCs disclosed herein may also be utilized in applications other than cutting technology. For example, the disclosed PDC embodiments may be used in wire dies, bearings, artificial joints, inserts, cutting elements, and heat sinks. Thus, any of the PDCs disclosed herein may be employed in an article of manufacture including at least one superabrasive element or compact.

Thus, the embodiments of the PCD bodies disclosed herein may be used in any apparatus or structure in which at least one conventional PDC is typically used. In one embodiment, one or more of the PCD bodies disclosed herein may be used in a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing any of the PCD bodies disclosed herein may be incorporated. The embodiments of PCD bodies disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PCD bodies disclosed herein are disclosed in U.S. Pat. Nos. 4,811,801; 4,274,900; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference. Examples of other articles of manufactures that the PCD bodies disclosed herein can be used in are disclosed in U.S. Provisional Patent Application No. 62/232, 732; U.S. patents application Ser. Nos. 13/790,046, 14/273, 360, 14/275,574, and 14/811,699.

In some embodiments, the PCD bodies disclosed herein may be formed from a superhard material other than PCD ("superhard bodies"). For example, the superhard bodies disclosed herein may be formed silicon diamond, cubic boron nitride (with or without binder), magnesium carbon diamond, or another material exhibiting a hardness greater than tungsten carbide. Except for being formed from superhard material other than PCD, the superhard bodies are the same or substantially similar to any of the PCD bodies disclosed herein. For example, the superhard bodies may include one or more threads, may be configured to be attached to any of the bodies (e.g., substrate, bit body, or support ring) disclosed herein, and may be used in any of the applications disclosed herein.

While various aspects and embodiments have been disclosed herein, other aspects and embodiments are contemplated. The various aspects and embodiments disclosed herein are for purposes of illustration and are not intended to be limiting.

Terms of degree (e.g., "about," "substantially," "generally," etc.) indicate structurally or functionally insignificant variations. In an example, when the term of degree is included with a term indicating quantity, the term of degree is interpreted to mean ±10%, ±5%, or ±2% of the term indicating quantity. In an example, when the term of degree is used to modify a shape, the term of degree indicates that the shape being modified by the term of degree has the appearance of the disclosed shape. For instance, the term of degree may be used to indicate that the shape may have rounded corners instead of sharp corners, curved edges instead of straight edges, one or more protrusions extending therefrom, is oblong, is the same as the disclosed shape, etc.

We claim:

1. An apparatus, comprising:
    at least one polycrystalline diamond body including:
        a top surface that is continuous and imperforate;
        a bottom surface opposite the top surface;
        at least one lateral surface extending from or near the top surface to or near the bottom surface; and
        one or more threads formed on at least a portion of the at least one surface of the polycrystalline diamond body, the one or more threads formed from polycrystalline diamond; and
    a component configured to be directly or indirectly attached to the at least one polycrystalline diamond body.

2. The apparatus of claim 1, wherein the top surface is substantially planar.

3. The apparatus of claim 1, wherein the one or more threads extend around a periphery of the polycrystalline diamond body.

4. The apparatus of claim 1, wherein the one or more threads are formed on at least a portion of the at least one lateral surface.

5. The apparatus of claim 1, further comprising an intermediate annular surface between the top surface and the bottom surface; and
    wherein the at least one lateral surface includes at least one first lateral surface extending from or near the top surface to or near the intermediate surface and at least one second lateral surface extending from or near the intermediate surface to or near the bottom surface.

6. The apparatus of claim 1, wherein the component includes a support ring.

7. The apparatus of claim 6, wherein the support ring includes a plurality of recesses, each of the plurality of recesses configured to receive a bearing element, the bearing element at least partially received in at least one of the plurality of recesses including the at least one polycrystalline diamond body.

8. The apparatus of claim 1, wherein the component includes a drill bit body.

9. The apparatus of claim 8, wherein the bit body includes one or more blades defining a plurality of recesses, a plurality of cutting element at least partially disposed in one or more of the plurality of recesses to one or more blades, at least one of the plurality of cutting elements including the at least one polycrystalline diamond body.

10. The apparatus of claim 1, wherein the component defines a cavity partially defined by at least one cavity lateral surface, the cavity configured to receive at least a portion of the at least one polycrystalline diamond body or a polycrystalline diamond compact including the at least one polycrystalline diamond body.

11. The apparatus of claim 10, wherein the at least one cavity lateral surface includes one or more cavity threads that are configured to threadedly engage with at least the one or more threads of the at least one polycrystalline diamond body.

12. The apparatus of claim 1, wherein:
    the one or more threads are formed on at least one cavity lateral surface of the polycrystalline diamond body, the at least one cavity lateral surface partially defining a cavity; and
    the component defines a protrusion including at least one protrusion lateral surface, the at least one protrusion lateral surface including one or more component threads configured to threadedly engage with the one or more threads of the at least one polycrystalline diamond body.

13. The apparatus of claim 1, further comprising a substrate.

14. The apparatus of claim 13, wherein the substrate is bonded or brazed to the at least one polycrystalline diamond body to form a polycrystalline diamond compact, wherein the substrate is distinct from the component.

15. The apparatus of claim 14, wherein:
    the substrate includes one or more substrate threads form on at least one substrate lateral surface of the substrate; and
    the component is a drill bit body or a support ring, the component including one or more component threads configured to threadedly engage with the one or more threads of the at least one polycrystalline diamond body and the one or more substrate threads.

16. The apparatus of claim 13, wherein the substrate defines a cavity partially defined by at least one cavity lateral surface, the at least one cavity lateral surface including one or more substrate threads that are configured to threadedly engage with the one or more threads of the at least one polycrystalline diamond body.

17. The apparatus of claim 16, wherein the component is a drill bit body or a support ring, the component defining a plurality of recesses, the substrate is brazed or press-fitted into one of the plurality of recesses.

18. A drill bit, comprising:
    a drill bit body including one or more blades; and
    a plurality of cutting elements attached to the one or more blades, at least one of the plurality of cutting elements including at least one polycrystalline diamond body, the at least one polycrystalline diamond body including:
a top surface that is continuous and imperforate;
a bottom surface opposite the top surface;
at least one lateral surface extending from or near the top surface to or near the bottom surface; and
one or more threads formed on at least a portion of the at least one surface of the polycrystalline diamond body, the one or more threads formed from polycrystalline diamond.

19. A bearing assembly, comprising:
a support ring; and
a plurality of bearing elements attached to the support ring, at least one of the bearing elements including at least one polycrystalline diamond body, the at least one polycrystalline diamond body including:
a top surface that is continuous and imperforate;
a bottom surface opposite the top surface;
at least one lateral surface extending from or near the top surface to or near the bottom surface; and
one or more threads formed on at least a portion of the at least one surface of the polycrystalline diamond body, the one or more threads formed from polycrystalline diamond.

20. A bearing apparatus, comprising:
a stator; and
a rotor configured to rotate relative to the stator; and
wherein the stator or the rotor includes the bearing assembly of claim 19.

* * * * *